United States Patent
Wittke

(10) Patent No.: US 12,431,134 B2
(45) Date of Patent: Sep. 30, 2025

(54) SYSTEMS AND METHODS FOR PERFORMING ACTIONS ON NETWORK-CONNECTED OBJECTS IN RESPONSE TO REMINDERS ON DEVICES BASED ON AN ACTION CRITERION

(71) Applicant: Adeia Guides Inc., San Jose, CA (US)

(72) Inventor: David G. Wittke, Simi Valley, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/222,064

(22) Filed: Jul. 14, 2023

(65) Prior Publication Data

US 2023/0360649 A1    Nov. 9, 2023

Related U.S. Application Data

(63) Continuation of application No. 17/115,084, filed on Dec. 8, 2020, now Pat. No. 11,749,269, which is a continuation of application No. 16/021,713, filed on Jun. 28, 2018, now Pat. No. 10,878,810.

(51) Int. Cl.
| | |
|---|---|
| G10L 15/22 | (2006.01) |
| G06F 16/9535 | (2019.01) |
| G10L 15/08 | (2006.01) |
| G10L 15/18 | (2013.01) |
| G10L 15/30 | (2013.01) |
| H04L 67/12 | (2022.01) |

(52) U.S. Cl.
CPC .......... *G10L 15/22* (2013.01); *G06F 16/9535* (2019.01); *G10L 15/1822* (2013.01); *G10L 15/30* (2013.01); *G10L 2015/088* (2013.01); *G10L 2015/223* (2013.01); *H04L 67/12* (2013.01)

(58) Field of Classification Search
USPC ..................................................... 704/1–504
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 * | 1/2007 | Boyer ................ | H04N 21/4782 709/219 |
| 7,706,553 B2 | 4/2010 | Brown | |

(Continued)

*Primary Examiner* — Marcus T Riley

(74) *Attorney, Agent, or Firm* — HALEY GUILIANO LLP

(57) ABSTRACT

Systems and methods are disclosed for performing actions on network-connected objects in response to reminders on devices. An input from a first user device is received wherein keywords of the input correspond to an action identifier corresponding to an action. The system determines a plurality of network-connected devices capable of performing the action. A comparison is executed for each of the plurality of network-connected devices which identifies a device identifier from the words of the input determining a target device for performing the action. The system determines a plurality of criteria identifiers for performing the action on the target device. A comparison is executed for each of the criteria identifiers which identifies an action criterion from the words of the input. A command is transmitted, from the user device, for the action to be executed on the target device according to the action criterion.

18 Claims, 14 Drawing Sheets

(56) References Cited

U.S. PATENT DOCUMENTS

| | | |
|---|---|---|
| 7,761,892 B2 | 7/2010 | Ellis et al. |
| 8,046,801 B2 | 10/2011 | Ellis et al. |
| 8,079,048 B2 | 12/2011 | Howcroft |
| 8,789,113 B2 | 7/2014 | Goergen et al. |
| 10,878,810 B2 * | 12/2020 | Wittke ............... G10L 15/22 |
| 11,032,354 B2 * | 6/2021 | Smus ............. H04M 1/72484 |
| 11,749,269 B2 * | 9/2023 | Wittke ............ G06F 16/9535 |
| | | 704/257 |
| 2002/0174430 A1 | 11/2002 | Ellis et al. |
| 2005/0251827 A1 | 11/2005 | Ellis et al. |
| 2006/0004743 A1 | 1/2006 | Murao et al. |
| 2007/0014420 A1 * | 1/2007 | Brown ............... H03G 3/342 |
| | | 381/110 |
| 2008/0148320 A1 * | 6/2008 | Howcroft ......... H04N 21/4786 |
| | | 386/E5.042 |
| 2010/0058394 A1 | 3/2010 | Goergen et al. |
| 2010/0153885 A1 | 6/2010 | Yates |
| 2010/0169098 A1 * | 7/2010 | Patch ................ G10L 15/193 |
| | | 704/275 |
| 2012/0069131 A1 * | 3/2012 | Abelow ............. G06Q 30/02 |
| | | 345/589 |
| 2014/0075303 A1 * | 3/2014 | Wong ................ G06F 3/048 |
| | | 715/704 |
| 2015/0339098 A1 | 11/2015 | Lee et al. |
| 2016/0260430 A1 * | 9/2016 | Panemangalore ...... G06F 3/167 |
| 2017/0236512 A1 * | 8/2017 | Williams ........... G10L 13/02 |
| | | 381/79 |
| 2018/0088902 A1 * | 3/2018 | Mese ................. G10L 15/22 |
| 2018/0109601 A1 * | 4/2018 | Smus ................ H04L 67/10 |
| 2018/0122378 A1 | 5/2018 | Mixter ............. H04L 67/306 |
| 2020/0005777 A1 * | 1/2020 | Wittke ............. H04L 67/535 |
| 2020/0225655 A1 * | 7/2020 | Cella .............. G06F 18/2178 |
| 2020/0348662 A1 * | 11/2020 | Cella ............ G05B 19/41865 |
| 2021/0157312 A1 * | 5/2021 | Cella ............... G01M 13/045 |
| 2021/0166690 A1 * | 6/2021 | Wittke ............... G10L 15/22 |
| 2023/0132451 A1 * | 5/2023 | Makker ............... G06F 3/16 |
| | | 704/275 |
| 2023/0360649 A1 * | 11/2023 | Wittke ............... G10L 15/30 |

* cited by examiner

SYSTEMS AND METHODS FOR PERFORMING ACTIONS ON NETWORK-CONNECTED OBJECTS IN RESPONSE TO REMINDERS ON DEVICES BASED ON AN ACTION CRITERION

CROSS-REFERENCE TO RELATED APPLICATION

This application is a continuation of U.S. patent application Ser. No. 17/115,084, filed Dec. 8, 2020, which is a continuation of U.S. patent application Ser. No. 16/021,713, filed on Jun. 28, 2018, now U.S. Pat. No. 10,878,810, the disclosure of which are hereby incorporated by reference herein in their entireties.

BACKGROUND

There are a myriad of electronic devices which allow for users to set timed reminders. Setting reminders on electronic devices allow the user to rely on the electronic device to notify the user of the particular pre-programmed reminder. Current reminder systems on electronic devices function only on the particular electronic devices from which the reminder is set. These electronic devices generally rely upon the labor of the user to set the reminder manually. If the user wishes to have multiple devices perform various functions, this necessitates the user to manually configure each electronic device independently and separately. Furthermore, implementation of "smart" devices (i.e., devices integrated with processors and able to perform simple computer functions) is now ubiquitous; however, despite this, users are unable to coordinate reminders on these devices.

SUMMARY

To provide a singular interface to coordinate distinct smart devices to set "smart" reminders, methods and systems are disclosed herein for performing actions on network-connected objects in response to reminders on devices. For example, conventional systems have no ability to set "smart" reminders because conventional system have no way of interpreting commands issued by a user that may include: (i) commands unique to a particular device, (ii) actions that may vary based on the particular device, and (iii) criteria that may differ based on both the device and criteria. For example, based on a user command, "No Sponge Bob after 7," conventional systems have no way to interpret that command to issue the necessary instructions (e.g., turning off or instructing a parental block) to the necessary device (e.g., the television, computer, tablet, etc.) in order to meet the expectations (e.g., at 7 PM) of the user.

To overcome the technical limitations of conventional systems, the media guidance application described herein utilizes recent advances in smart device use and Internet of Things ("IoT") applications to process user inputs. Building on these recent advances, the methods and systems of the media guidance application process information according to specific rules in order to provide "smart" reminders. These specific rules allow for computer functionality that could previously only be performed manually (i.e., set reminders on different devices) by a user as well as computer functionality that was previously not possible (e.g., parsing an input to coordinate a plurality of other electronic devices to execute actions according to specific criteria associated with a reminder. Accordingly, the media guidance application described herein provides a singular interface to coordinate distinct smart devices to set smart reminders by parsing a user command to determine a target device, a particular action to be performed on the target device, and action criterion determining the command for the particular action.

One example of an application performing actions on network-connected objects in response to reminders, is in the context of creating reminders on a media guidance application implemented by user equipment which operates media content. For example, a user may wish to implement a reminder on a number of electronic devices in order to have holistic coverage of the reminder on multiple devices. This entails that the user must configure each electronic device with the same reminder, resulting in excessive labor on the part of the user to configure each electronic device. Moreover, this also provides auxiliary concerns by attempts to synchronize each electronic device in order to have the reminder appear at the same or similar times. Application of the Internet of Things ("IoT") technology allows for multiple electronic devices to communicate with each other to better coordinate.

Continuing with the above example, the user may wish to have the reminder displayed to a number of other users in the household which presents another problem. It may be desirable to provide the reminder to only a select group of users within the household, and thus a permission based system need also be implemented to provide reminders for only users permitted to receive the reminder and/or provide special functionality based on these permissions.

Accordingly, to overcome the problems created when multiple users with corresponding network-connected devices are not connected by a permission based network, systems and methods are described herein for performing actions on network-connected objects in response to reminders on devices based on an action criterion. Furthermore, as opposed to conventional methods of implementing reminders on an electronic device, the systems and methods use a single input to parse which network-connected devices are implemented, and determine a specific action criterion for the action to be executed. Specifically, the media guidance application may receive an input from a first user device. The media guidance application may parse, at the first user device, words of the input to identify a first keyword. The first keyword may correspond to an action identifier for one of a plurality of network actions. The media guidance application may determine, at the first user device, an action corresponding to the action identifier. The media guidance application may determine, at the first user device, a plurality of network-connected devices capable of performing the action. The media guidance application may determine a plurality of device identifiers for each of the plurality of network-connected devices. The media guidance application may execute a first comparison of each of the plurality of device identifiers for each of the plurality of network-connected devices to the words of the input to identify a second keyword. The second keyword may correspond to one of the plurality of device identifiers for one of the plurality of network-connected devices. The media guidance application may determine, based on the second keyword, a target device, from the plurality of network-connected devices. The target device may perform the action. The media guidance application may determine a plurality of criteria identifiers for performing the action on the target device. The media guidance application may execute a second comparison of each of the plurality of criteria identifiers for performing the action on the target device to the words of the input to identify a third keyword. The third keyword may correspond to an action criterion performing the action on the target device. The media guidance application may determine a command for executing the action on the target device according to the action criterion. The media guidance application may transmit the command, from the first user device, to the target device.

Accordingly, a plurality of network-connected objects may be configured by the media guidance application to execute a reminder through a single input in a user device. The techniques described does not require labor intense configuration on the part of the user to configure each and every device of the plurality of network-connected objects manually; instead, the media guidance application receives and parses the user input to determine the specific set of network-connected objects required to execute the reminder. By determining a target device, the number of possible actions in totality is greatly reduced to only those actions possible by the target device. This allows for more expedient use of processor resources to determine the specific action to be executed by the target device. Therefore, once the target device is found, the third keyword (e.g., action criterion) has device specific context in allowing for expedient processing of the actions on network-connected objects in response to reminders on devices.

As an example, a father in a household may be watching a movie on his network enabled television while his two sons are also watching the same movie being displayed on their own respective electronic devices (e.g., network connected tablets). The household has a local network which facilitates multiple network-connected devices. The father may wish to set a reminder to leave to go to grandma's house for dinner. The father uses his own user device, a smartphone, to initiate a voice input stating that "set reminder for everyone to leave for grandma's house in 25 minutes." The father has preconfigured the media guidance application to state that his account is that of administrator, while his sons' accounts are non-administrator. The configuration is such that upon the reminder for non-administrators, and upon the reminder implementing on completion, the non-administrator devices are non-responsive and cannot be overridden within administrative permission. Therefore, upon the father's smartphone receiving the initial voice input, the voice input is parsed to identify a first keyword corresponding to an action identifier. In the current example, the action is "leave" from the voice input. The media guidance application may then determine an action corresponding to the action identifier "leave". For example, here the media guidance application may access a database look-up table which maps "leave" to the action "exit media program and turn off device". The media guidance application then determines the plurality of network devices capable of performing the action. Here, the media guidance application may determine all devices, and device identifiers, known to the local network capable of performing the "exit media program and turn off device." The media guidance application may then compare each of the device identifiers with a second keyword "everyone" from the voice input. The media guidance application may determine, through the device identifiers, that the television and two tablets are currently playing the media content, and each of them is capable of the action of "exit media program and turn off device" and identifies these as the target devices to perform the action. The media guidance application may then determine all of the criteria identifiers for performing the action on the target device (e.g., all possible criteria identifiers for the action associated with shutting off the device is determined for the tablets and television devices). Each of these criteria identifiers is compared with the initial input which matches a third keyword parsed from the voice input, namely "in 25 minutes." The media guidance application may determine that the action of "exit media program and turn off device" will be responsive to the action criterion of a timer of 25 minutes from initiation of this instruction. The media guidance application may determine the corresponding command for each of the television and two tablet devices and transmits the commands respectively. As the father watches the media on the television, and the sons are watching on their respective tablets, upon the 25 minutes expiration, the movie will close and each device will power off. Perhaps in some embodiments, a notification stating that "Reminder! Event at Grandma's House!" may be displayed for each user. Because the father has administrative control, he may be able to disable or override the action being performed on one or more target devices upon a further input. This is in contrast to the electronic devices of his sons' in this example, as none of the sons have administrative control.

The media guidance application may perform the following actions to enable performing actions on network-connected objects in response to reminders on devices. The media guidance application may receive, from a user, an input from a first user device. For example, the media guidance application may receive a voice input from a user (e.g., a father) smartphone stating that "set reminder for everyone to leave for grandma's house in 25 minutes." By receiving the input from a first user device, the media guidance application may be able to perform further analysis to coordinate network-connected objects based on this input.

The media guidance application may parse, at the first user device, words of the input. The parsing may identify a first keyword corresponding to an action identifier for one of a plurality of network actions. Continuing from the previous example, upon the father's smartphone receiving the initial voice input, the voice input is parsed to identify a first keyword corresponding to an action identifier. In the current example, the action is "leave" from the voice input. By determining a keyword from the parsed input, further matching analysis may be conducted in order to send commands to a network-connected device.

The media guidance application may determine, at the first user device, an action corresponding to the action identifier. Continuing from the previous example, the media guidance application may determine an action corresponding to the action identifier "leave." Here the media guidance application may access a database look-up table which maps "leave" to the action "exit media program and turn off device". By determining an action corresponding to the action identifier, the media guidance application may determine which devices may be applicable to carry out the specific action and can coordinate a network-connected device to perform the action.

The media guidance application may determine, at the first user device, a plurality of network-connected devices capable of performing the action. Continuing from the previous example, the media guidance application may determine all devices known to the local network capable of performing the "exit media program and turn off device.". By determining the relevant devices which can perform the action, the media guidance application is able to determine a set of devices from which it is possible to assign a command to carry out the function.

The media guidance application may determine a plurality of device identifiers for each of the plurality of network-connected devices. Continuing from the previous example, the media guidance application may determine all device identifiers by, for example, requesting the network identifiers of each of the devices connected to the network. By being able to identify the network devices, the media guidance application has the means to identify the relevant devices in order to send commands for performing the action.

The media guidance application may execute a first comparison of each of the device identifiers for each of the network-connected devices, to the words of the input to identify a second keyword. The second keyword corresponds to one of the plurality of device identifiers for one of the plurality of network-connected devices. Continuing from the previous example, the media guidance application may then compare each of the device identifiers with a second keyword "everyone" from the voice input. The media guidance application may interpret "everyone" to include all detected network-connected devices. By determining devices by parsing a second keyword from the input, the media guidance application is able to direct a command to a set device to perform the action.

The media guidance application may determine, based on the second keyword, a target device, from the plurality of network-connected devices, for performing the action. Continuing from the previous example, the media guidance application may determine, through the device identifiers, that the television and two tablets are currently playing the media content, and each of them are capable of the action of "exit media program and turn off device." Thus, the media guidance application identifies these devices as the target devices to perform the action. By identifying one or more target devices, the media guidance application is able to direct a command to a set device to perform the action. By determining a target device, the number of possible actions in totality is greatly reduced to only those actions possible by the target device. This allows for more expedient use of processor resources to determine the specific action to be executed by the target device. Moreover, the determination of the action criterion is further narrowed and made for efficiency by this technique of determining action, followed by device, and followed by examiner criterion.

The media guidance application may determine a plurality of criteria identifiers for performing the action on the target device. Continuing from the previous example, the media guidance application may then determine all of the criteria identifiers for performing the action on the target device (e.g., all possible criteria identifiers for the action associated with shutting off the device is determined for the tablets and television devices). By identifying all criteria identifiers of the target devices, a higher level of configuration may be applied to ensure a more accurate command for performing the action.

The media guidance application may execute a second comparison of each of the plurality of criteria identifiers for performing the action on the target device to the words of the input to identify a third keyword. The third keyword corresponds to an action criterion performing the action on the target device. Continuing from the previous example, each of the previously determined criteria identifiers are compared with the initial input which matches a third keyword parsed from the voice input, namely "in 25 minutes." By identifying an action criterion of the target devices, a higher level of configuration may be applied to ensure a more accurate command for performing the action.

The media guidance application may determine a command for executing the action on the target device according to the action criterion. Continuing from the previous example, the media guidance application may determine that the action of "exit media program and turn off device" will be responsive to the action criterion of a timer of 25 minutes from initiation of this instruction. By using the action criterion, a device specific command may be implemented on a target device which is network-connected in order to perform the action.

The media guidance application may transmit the command, from the first user device, to the target device. Continuing from the previous example, the media guidance application may determine the corresponding command for each of the television and two tablet devices and transmits the commands respectively. As the father watches the media on the television, and the sons are watching on their respective tablets, upon the 25 minutes expiration, the movie will close and each device will power off. By sending the commands to the target devices, each of the network-operated devices are able to perform the action.

In some embodiments, the media guidance application may input the action identifier into a database listing actions corresponding to action identifiers. Continuing from the previous example, the action identifier is "leave" from the voice input. This is input into a database which contains various actions and having corresponding action identifiers. By having a correspondence between a parsed term (e.g., action identifier) and the action itself, the media guidance application can translate a voice command to a device specific action.

In some embodiments, the media guidance application may filter the database listing actions corresponding to action identifiers based on the action identifier to identify the action. Continuing from the previous example, the database results will filter all results to results in relation to "leave" such as "shut-down", "pause", "blank screen", "transfer screen to secondary device" (e.g., mobile device). By filtering the different device based functions, the media guidance application may translate a voice command to a device specific action.

In some embodiments, the media guidance application may determine if any of the filtered actions listed in the database correspond to the action identifier input. If yes, the media guidance application outputs the action. Continuing from the previous example, the media guidance application may retrieve "leave" with the action "exit media program and turn off device." The media guidance application then outputs the action. By outputting the determined action, the media guidance application may translate a voice command to a device specific action.

In some embodiments, the media guidance application may input the action into a database which lists network-connected devices capable of performing actions. Continuing from the previous example, upon determining the action "exit media program and turn off device", the media guidance application may input this action into a database which lists the number of network-connected devices which are capable of performing this action. For example, the database may list the television and two tablets are capable devices. By having a database determine the specific devices capable of performing the action, the media guidance application can accurately determine the correct network-operating device to perform the action.

In some embodiments, the media guidance application may filter the database listing network-connected devices capable of performing actions based on the action to identify the plurality of network-connected devices capable of performing the action. Continuing from the previous example, the database results will filter all results to only those devices which can perform the action. Here, both the tablets and the television can perform the "exit media program and turn off device" action. By filtering the different device based functions, the media guidance application may translate a voice command to a device specific action.

In some embodiments, the media guidance application may output the plurality of network-connected devices capable of performing the action. Continuing from the previous example, the media guidance application may output the tablets and the television as devices capable of performing the action of "exit media program and turn off device." By outputting the capable devices action, the media guidance application is able to identify the correct devices to perform the action.

In some embodiments, the media guidance application may input each of the plurality of network-connected devices into a database listing device identifiers corresponding to network-connected devices. Continuing from the previous example, upon determining that the television and two tablets are capable devices, the database lists the device identifiers for specific network-connected devices (e.g., by network device identification). By having a device identification, the media guidance application can accurately determine the correct network-operating device to perform the action.

In some embodiments, the media guidance application may filter the database listing device identifiers corresponding to network-connected devices based on each of the plurality of network-connected devices to identify the plurality of device identifiers for each of the plurality of network-connected devices. Continuing from the previous example, the database results will filter all the device identifiers to only those devices which are connected to the network. Here, both the tablets and the television are connected to the home network and thus will be listed as "filtered" results. By filtering the device identifiers, the media guidance application can more accurately determine the target devices to perform the action.

In some embodiments, the media guidance application may output the plurality of device identifiers for each of the plurality of network-connected devices. Continuing from the previous example, the media guidance application may output the device identifiers for each network-connected device. Here, the media guidance application will output device identifiers for the television and two tablets. By outputting the device identifiers for the network-connected devices, the media guidance application is able to identify the correct devices to perform the action.

In some embodiments, the media guidance application may input the device identifier that corresponds to the second keyword to the database listing device identifiers corresponding to network-connected devices. Continuing from the previous example, upon determining that the television and two tablets are capable devices, the device identifiers for the two tablets and the television (which correspond to the second keyword "everyone"), is input into the database. By having a device identification, the media guidance application can accurately determine the correct network-operating device to perform the action.

In some embodiments, the media guidance application may filter the database listing device identifiers corresponding to network-connected devices based on the device identifier that corresponds to the second keyword to identify the target device. Continuing from the previous example, the database results will filter all the device identifiers to only the two tablets and the television. By filtering the device identifiers, the media guidance application can more accurately determine the target devices to perform the action.

In some embodiments, the media guidance application may output the target device. Continuing from the previous example, the media guidance application may output both the tablets and the television as the target devices. By outputting the determined target devices, the media guidance application can identify the correct devices to perform the action.

In some embodiments, the media guidance application may input the action and the target device into a database listing criteria identifiers corresponding to specific actions on specific network-connected devices. Continuing from the previous example, upon determining that the television and two tablets are the target devices and the action (e.g., "exit media program and turn off device") are input into the database.

In some embodiments, the media guidance application may filter the database listing criteria identifiers corresponding to specific actions on specific network-connected devices based on the action and the target device to identify the plurality of criteria identifiers for performing the action on the target device. Continuing from the previous example, the database results will filter all the device specific criteria identifiers specific to the target devices such as "device shut-off", "pause", and "blank screen". By filtering the criteria identifiers, the media guidance application can more accurately determine the target devices to perform the action.

In some embodiments, the media guidance application may output the plurality of criteria identifiers for performing the action on the target device. Continuing from the previous example, the media guidance application may output all criteria identifiers (e.g., as mentioned above). By outputting the criteria identifiers for the target devices, the media guidance application can identify the correct set of potential action criterion to be performed by the target devices.

In some embodiments, the media guidance application may input the action and the target device into a database listing command codes corresponding to specific actions on specific network-connected devices. Continuing from the previous example, upon determining that the television and two tablets are the target devices and the action (e.g., "exit media program and turn off device") are input into the database, the database lists specific command codes for specific actions. For example, the database may list a hash function corresponding to "device shut-off" for the television. By having corresponding command codes, the media guidance application can accurately determine the target devices to perform the action.

In some embodiments, the media guidance application may filter the database listing command codes corresponding to specific actions on specific network-connected devices based on the action and the target device to identify the command code. Continuing from the previous example, the database results will filter all the actions for the target device based on the action and corresponding command codes.

In some embodiments, the media guidance application may output the command code. Continuing from the previous example, the media guidance application may output the specific hash code. By outputting the command code, the media guidance application has specific data corresponding to a specific action for the target device which enables the action to be performed with accuracy.

In some embodiments, the media guidance application may input the action criterion into a database listing command settings corresponding to performing specific actions according to specific criteria on specific network-connected devices. Continuing from the previous example, upon determining that the television and two tablets must be turned off in "25 minutes" (e.g., action criterion), this is input into the database.

In some embodiments, the media guidance application may filter the database listing command settings corresponding to performing specific actions according to specific criteria on specific network-connected devices based on the action criterion to identify the command setting for executing the action on the target device according to the action criterion. Continuing from the previous example, the database results will filter all the actions for the target device based on the action criterion and identify a command setting for execution specific to the two tablets and the television. The command setting may be a device related information.

In some embodiments, the media guidance application may output the command setting. Continuing from the previous example, the media guidance application may output the specific device related information. By outputting the command setting, the media guidance application has specific data corresponding to a specific action for the target device which enables the action to be performed with accuracy.

In some embodiments, the media guidance application may generate the command based on the command code and the command setting. Continuing from the previous example, the command for the television and two tablets may be generated by the hash code (e.g., command code) and the command setting (e.g., device related information). By generating the command based on both the command code and the command setting, the media guidance application has specific data corresponding to a specific action for the target device which enables the action to be performed with accuracy.

In some embodiments, the media guidance application may retrieve the plurality of criteria identifiers from the first user device. Continuing from the previous example, the media guidance application may retrieve the criteria identifiers from the father's mobile phone from which the input was given. For example, the mobile phone may have information about the television and two tablets (e.g., target devices) which may be useful to determining the criteria identifiers of the target devices. By retrieving the criteria identifiers from the first user device, the media guidance application may expediently configure the target devices to perform the action.

In some embodiments, the media guidance application may retrieve custom criteria identifiers to be used as the plurality of criteria identifiers, wherein the custom criteria identifiers are retrieved from an external source. Continuing from the previous example, the media guidance application may retrieve the criteria identifiers from the television manufacturer's website which has full information and support for the television device. By retrieving the criteria identifiers from an external source, the media guidance application may expediently configure the target devices to perform the action.

In some embodiments, the media guidance application may detect connectivity of the target device to the first user device. Continuing from the previous example, the father's mobile phone may detect the television on the same network.

In some embodiments, the media guidance application may retrieve action data from the target device, wherein the action data comprises one or more actions associated with the target device. Continuing from the previous example, the father's mobile phone may retrieve information in relation to the TV's functionality from his mobile phone.

In some embodiments, the media guidance application may generate the plurality of criteria identifiers, wherein each of the plurality of criteria identifiers is associated with the action data. Continuing from the previous example, the father's mobile phone may create a number of actions, specific to the television, from the retrieved information. By retrieving the information from the target device upon connectivity to the network, the media guidance application efficiently gathers the information needed to determine whether the target device can accomplish the action.

In some embodiments, the media guidance application may transmit a request to a remote server for action data in association with the target device, wherein action data comprises one or more actions associated with the target device. Continuing from the previous example, the media guidance application may send a request to the television (e.g., target device) manufacturer's website for action data (e.g., types of features/actions associated with the television). By retrieving the information from a remote server, the media guidance application receives information required to determine whether the target device is capable to perform the action.

In some embodiments, the media guidance application may receive the action data from the remote server in association with the target device. Continuing from the previous example, the media guidance application may receive, from the manufacturer's website, action data associated with the television.

In some embodiments, the media guidance application may generate the plurality of criteria identifiers, wherein each of the plurality of criteria identifiers is associated with the action data. Continuing from the previous example, the media guidance application may generate, based on the action data, a number of criteria identifiers which are used to determine whether the target deice can perform the action criterion (e.g., "leave . . . in 25 minutes"). By generating criteria identifiers from action data from a remote server, the media guidance application receives information required to determine whether the target deice is capable to perform the action.

It should also be noted that the systems and/or methods described above may be applied to, or used in accordance with, other systems and/or methods.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
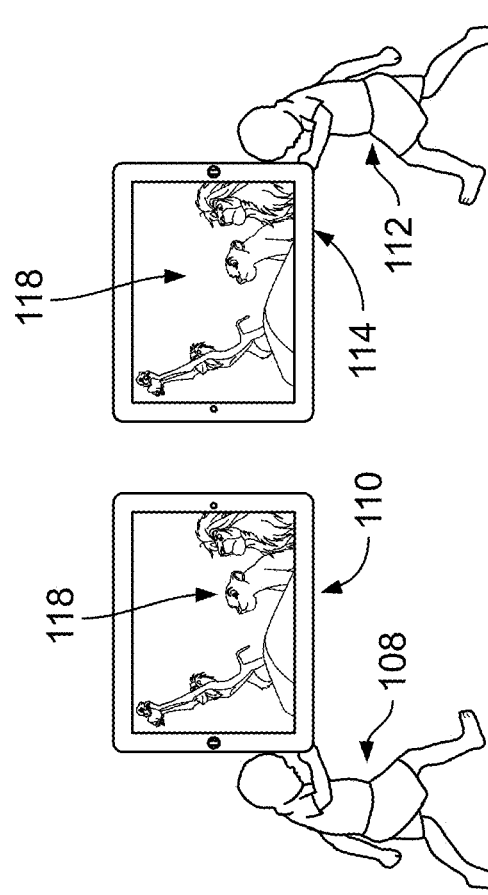
FIG. 1A shows an illustrative embodiment of three family members watching a first common media asset in two distinct rooms on respective electronic devices at a first time period.
Figure 1A:
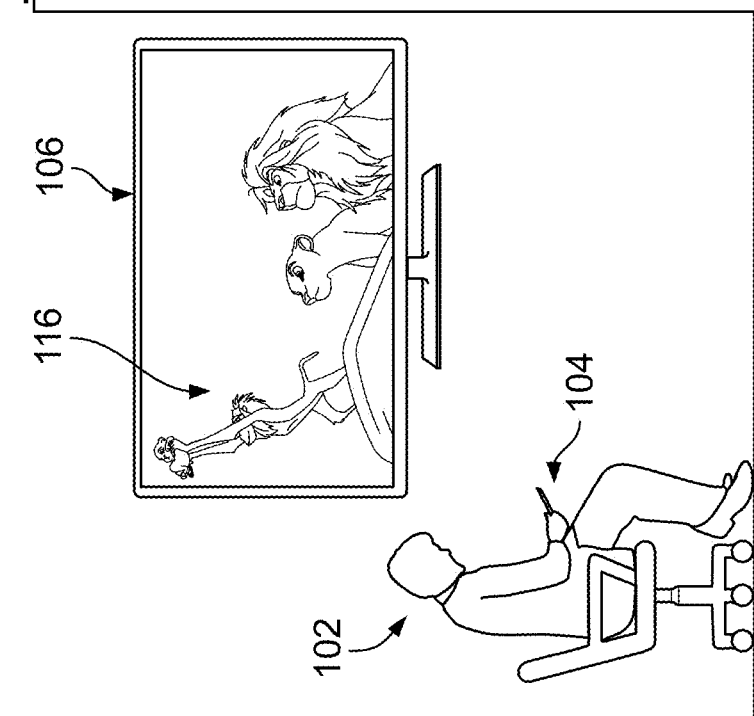

Systems and methods are described herein for performing actions on network-connected objects in response to reminders on devices. In some aspects, the media guidance application may perform the following actions to enable performing actions on network-connected objects in response to reminders on devices. The media guidance application may receive, from a user, an input from a first user device. In some embodiments, an input may be any type of information received by the user device. For example, an input may be an audio message from a user received by the user device. In some embodiments, the input may be a textual message sent to the user device. In some embodiments, the input may be a picture (e.g., setting, text, code, etc.). For example, the media guidance application may receive a voice input from a user (e.g., a father) smartphone stating that "set reminder for everyone to leave for grandma's house in 25 minutes." FIG. 1A shows an illustrative embodiment 100 of three family members watching a first common media asset (e.g., The Lion King) in two distinct rooms (e.g., 120 and 122) on respective electronic devices at a first time period. Specifically, the father 102 is watching the media on a television 106 where the content displayed on the television 116 is the same as the content displayed 118 for his two sons (108 and 112) watching on their respective tablet devices, 110 and 114 respectively. The father inputs the voice command to his mobile phone 104. By receiving the input from a first user device, the media guidance application may be able to perform further analysis to coordinate network-connected objects based on this input.

The media guidance application may parse, at the first user device, words of the input. The parsing may identify a first keyword corresponding to an action identifier for one of a plurality of network actions. In some embodiments, the word may be one or more words or a phrase. Continuing from the previous example, upon the father's smartphone receiving the initial voice input, the voice input is parsed to identify a first keyword corresponding to an action identifier. In the current example, the action is "leave" from the voice input. By determining a keyword from the parsed input, further matching analysis may be conducted in order to send commands to a network-connected device.

The media guidance application may determine, at the first user device, an action corresponding to the action identifier. Continuing from the previous example, the media guidance application may determine an action corresponding to the action identifier "leave." Here the media guidance application may access a database look-up table which corresponds "leave" with the action "exit media program and turn off device". By determining an action corresponding to the action identifier, the media guidance application may determine which devices may be applicable to carry out the specific action and can coordinate a network-connected device to perform the action.

The media guidance application may determine, at the first user device, a plurality of network-connected devices capable of performing the action. In some embodiments, a network connected device is any device with a processor and network connectivity. For example, a network-connected device may be a mobile phone, smart appliances (e.g., fridge, blender, toaster, oven, washer dryer, etc.), furniture (e.g., couch, table, chairs, etc.), house related fixtures or equipment (e.g., lighting, HVAC devices, doors, floors, etc.). Continuing from the previous example, the media guidance application may determine all devices known to the local network capable of performing the "exit media program and turn off device.". By determining the relevant devices which can perform the action, the media guidance application is able to determine a set of devices from which it is possible to assign a command to carry out the function.

The media guidance application may determine a plurality of device identifiers for each of the plurality of network-connected devices. Continuing from the previous example, the media guidance application may determine all device identifiers by, for example, requesting the network identifiers of each of the devices connected to the network. By being able to identify the network devices, the media guidance application has means to identify the relevant devices in order to send commands for performing the action.

The media guidance application may execute a first comparison of each of the device identifiers for each of the network-connected devices, to the words of the input to identify a second keyword. The second keyword corresponds to one of the plurality of device identifiers for one of the plurality of network-connected devices. Continuing from the previous example, the media guidance application may then compare each of the device identifiers with a second keyword "everyone" from the voice input. The media guidance application may interpret "everyone" to include all detected network-connected devices. By determining devices by parsing a second keyword from the input, the media guidance application is able to direct a command to a set device to perform the action.

The media guidance application may determine, based on the second keyword, a target device, from the plurality of network-connected devices, for performing the action. Continuing from the previous example, the media guidance application may determine, through the device identifiers, that the television and two tablets are currently playing the media content, and each of them are capable of the action of "exit media program and turn off device." Thus, the media guidance application identifies these devices as the target devices to perform the action. By identifying one or more target devices, the media guidance application is able to direct a command to a set device to perform the action.

The media guidance application may determine a plurality of criteria identifiers for performing the action on the target device. Continuing from the previous example, the media guidance application may then determine all of the criteria identifiers for performing the action on the target device (e.g., all possible criteria identifiers for the action associated with shutting off the device is determined for the tablets and television devices). By identifying all criteria identifiers of the target devices, a higher level of configuration may be applied to ensure a more accurate command for performing the action.

The media guidance application may execute a second comparison of each of the plurality of criteria identifiers for performing the action on the target device to the words of the input to identify a third keyword. The third keyword corresponds to an action criterion performing the action on the target device. Continuing from the previous example, each of the previously determined criteria identifiers are compared with the initial input which matches a third keyword parsed from the voice input, namely "in 25 minutes." By identifying an action criterion of the target devices, a higher level of configuration may be applied to ensure a more accurate command for performing the action.

The media guidance application may determine a command for executing the action on the target device according to the action criterion. Continuing from the previous example, the media guidance application may determine that the action of "exit media program and turn off device" will be responsive to the action criterion of a timer of 25 minutes from initiation of this instruction. By using the action criterion, a device specific command may be implemented on a target device which is network-connected in order to perform the action.

Figure 1B:
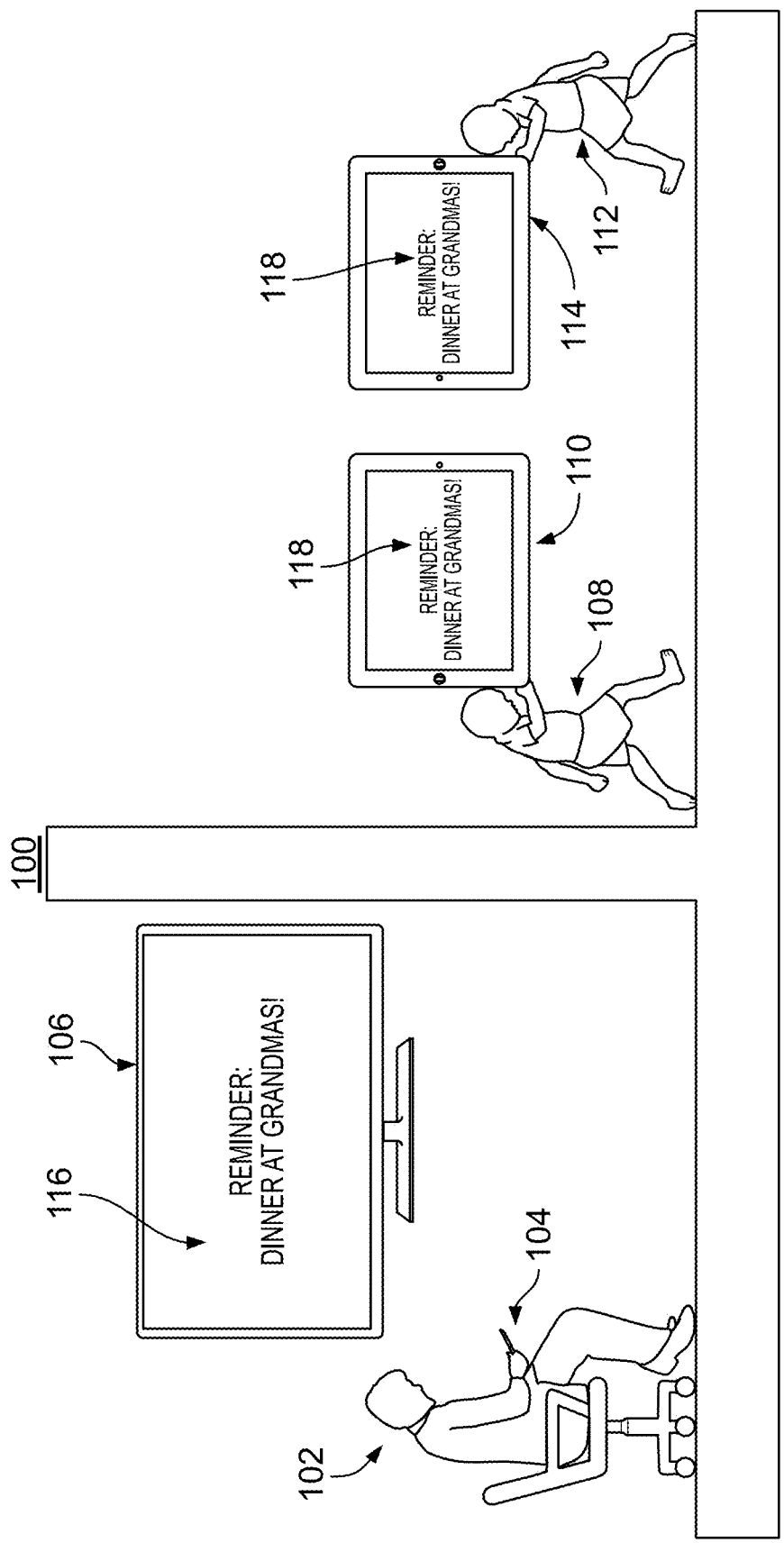
FIG. 1B shows an illustrative embodiment of three family members watching a first common media asset in two distinct rooms on respective electronic devices at a second time period.
Figure 1C:
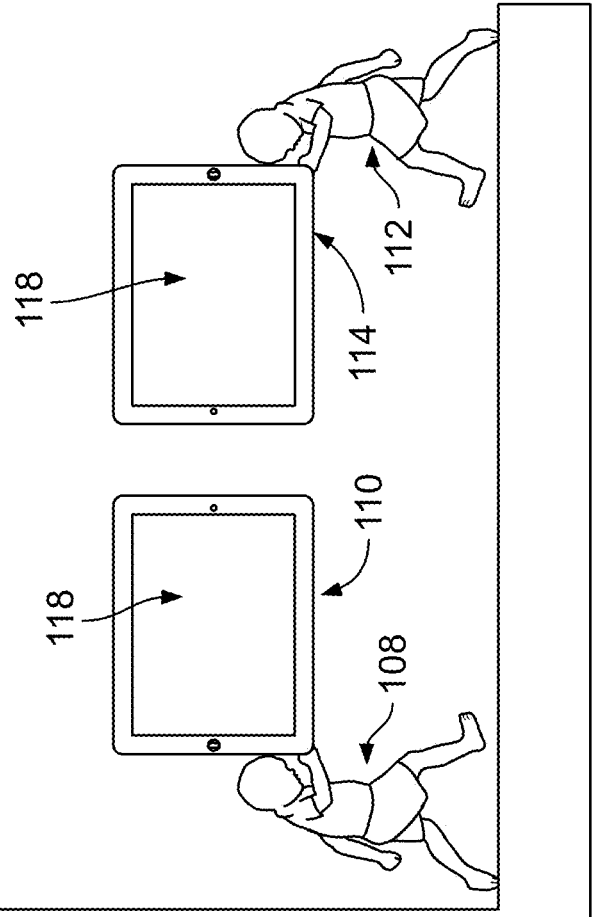
FIG. 1C shows an illustrative embodiment of three family members watching a first common media asset in two distinct rooms on respective electronic devices at a third time period.
Figure 1C:
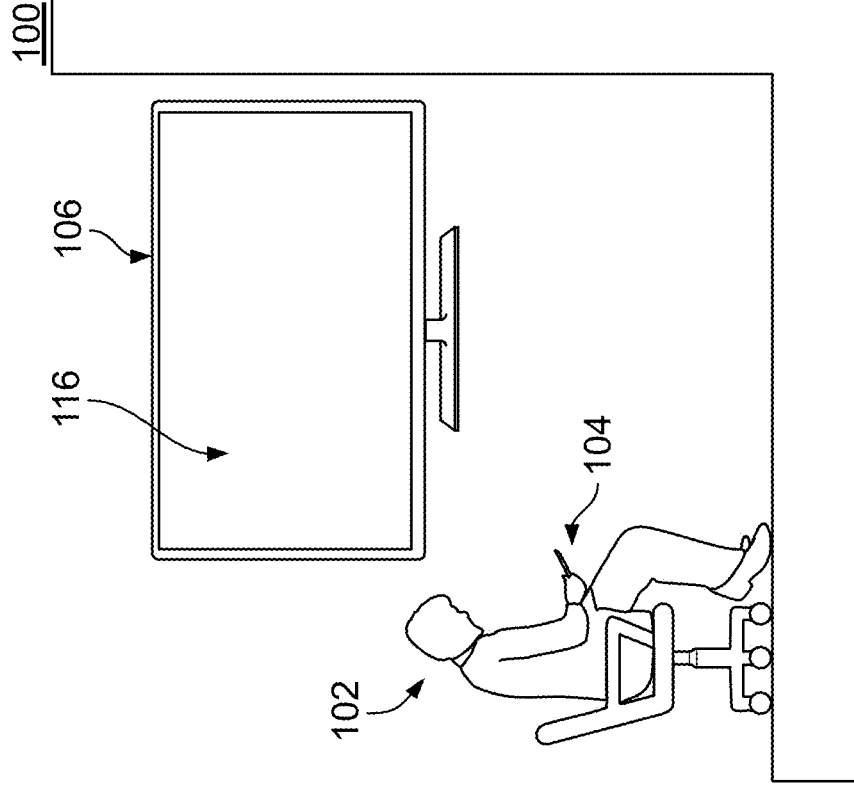

The media guidance application may transmit the command, from the first user device, to the target device. Continuing from the previous example, the media guidance application may determine the corresponding command for each of the television and two tablet devices and transmits the commands respectively. As the father watches the media on the television, and the sons are watching on their respective tablets, upon the 25 minutes expiration, the movie will close and each device will power off. FIG. 1B shows an illustrative embodiment of three family members watching a first common media asset in two distinct rooms on respective electronic devices at a second time period. The media content (116 and 118) on the television 106 and the tablets, 110 and 114 respectively, provide for the reminder "Reminder! Dinner at Grandmas!" after the 25 minute timer has come to conclusion. FIG. 1C shows an illustrative embodiment of three family members watching a first common media asset in two distinct rooms on respective electronic devices at a third time period. After the reminder is provided, the command is for the target devices (e.g., the television, and two tablets) to shutdown. As seen in FIG. 1C, the media content 116, and 118 on the television and tablets respectively have been exited and the device turned off. By sending the commands to the target devices, each of the network-operated devices are able to perform the action.

Figure 1D:
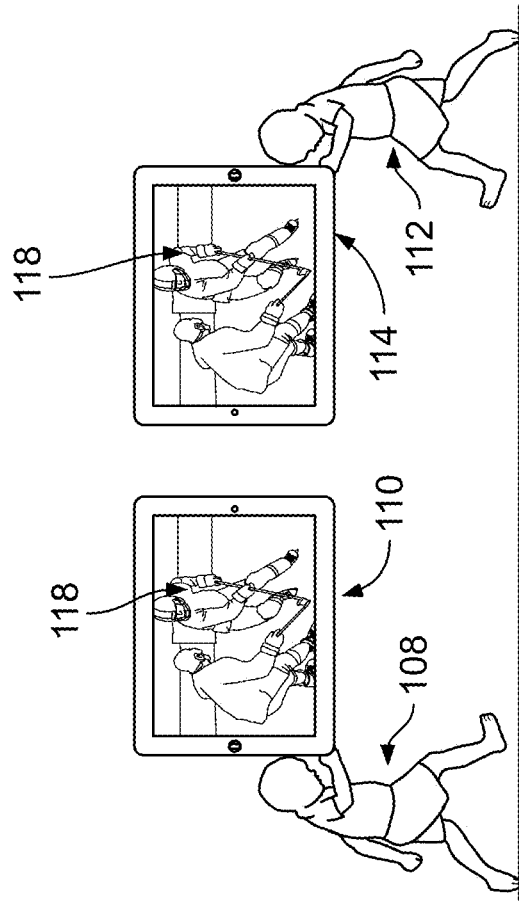
FIG. 1D shows an illustrative embodiment of three family members watching a second common media asset in two distinct rooms on respective electronic devices at a first time period.
Figure 1D:
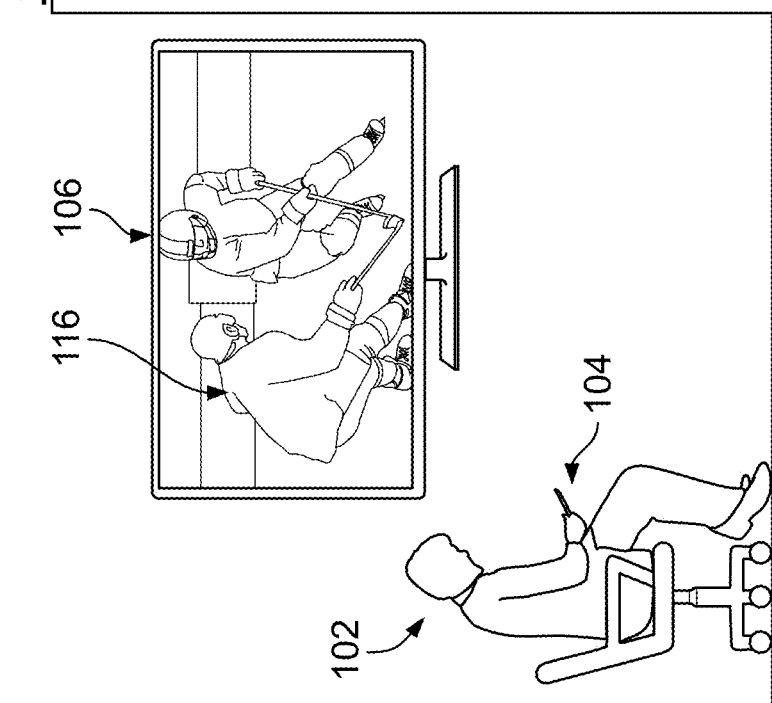
Figure 1E:
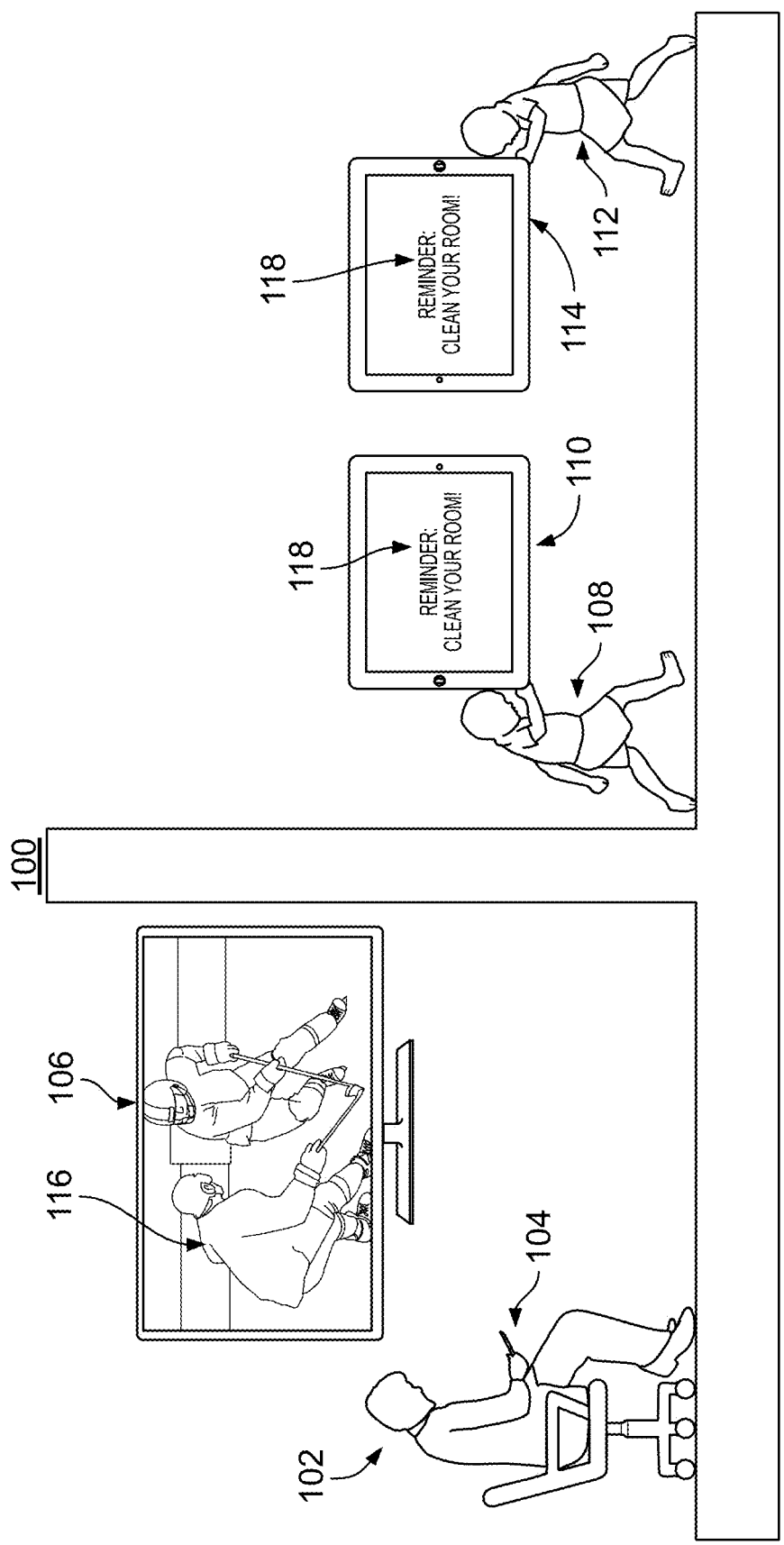
FIG. 1E shows an illustrative embodiment of three family members watching a second common media asset in two distinct rooms on respective electronic devices at a second time period.

FIG. 1D shows an illustrative embodiment of three family members watching a second common media asset in two distinct rooms on respective electronic devices at a first time period. The father and the sons are watching a hockey game on their respective devices (the television 116 and the two tablets 110 and 114). FIG. 1E shows an illustrative embodiment of three family members watching a second common media asset in two distinct rooms on respective electronic devices at a second time period. In this scenario, the father has administrative privilege where he has configured the command to provide a reminder to only non-administrative parties. In this case, after the conclusion of the first period, the reminder was issued to the sons to "Reminder: Clean your room!". The sons cannot override this reminder sent from the administrator and continue to watch content without the express override command from the administrator. In some embodiments, this may be configured to have a time-out such that after one hour the blocked screen, of the reminder, is lifted. This is one example of permissions based reminders where the reminders effect a defined group of users on the network. The group of users can be automatically grouped based on device identity or other characteristics of the device or assigned user account with the device. In some embodiments, the administrator can manually configure the reminders for various network groups. In yet other embodiments, the reminders are automatically configured for certain groups based on pre-configured rules.

In some embodiments, the media guidance application may input the action identifier into a database listing actions corresponding to action identifiers. Continuing from the previous example, the action identifier is "leave" from the voice input. This is entered into a database which contains various actions and having corresponding action identifiers. In some embodiments, the database may be local to the network. In some embodiments, the database may be remote. In some embodiments, the database may be part of the user device, target device, or other network device. By having a correspondence between a parsed term (e.g., action identifier) and the action itself, the media guidance application can translate a voice command to a device specific action.

In some embodiments, the media guidance application may filter the database listing actions corresponding to action identifiers based on the action identifier to identify the action. Continuing from the previous example, the database results will filter all results to results in relation to "leave"

such as "shut-down", "pause", "blank screen", "transfer screen to secondary device" (e.g., mobile device). By filtering the different device based functions, the media guidance application may translate a voice command to a device specific action.

In some embodiments, the media guidance application may determine if any of the filtered actions listed in the database correspond to the action identifier input. If yes, the media guidance application outputs the action. Continuing from the previous example, the media guidance application may retrieve "leave" with the action "exit media program and turn off device." The media guidance application then outputs the action. By outputting the determined action, the media guidance application may translate a voice command to a device specific action.

In some embodiments, the media guidance application may input the action into a database which lists network-connected devices capable of performing actions. Continuing from the previous example, upon determining the action "exit media program and turn off device", the media guidance application may input this action into a database which lists the number of network-connected devices which are capable of performing this action. For example, the database may list the television and two tablets are capable devices. By having a database determine the specific devices capable of performing the action, the media guidance application can accurately determine the correct network-operating device to perform the action.

In some embodiments, the media guidance application may filter the database listing network-connected devices capable of performing actions based on the action to identify the plurality of network-connected devices capable of performing the action. Continuing from the previous example, the database results will filter all results to only those devices which can perform the action. Here, both the tablets and the television can perform the "exit media program and turn off device" action. By filtering the different device based functions, the media guidance application may translate a voice command to a device specific action.

In some embodiments, the media guidance application may output the plurality of network-connected devices capable of performing the action. Continuing from the previous example, the media guidance application may output the tablets and the television as devices capable of performing the action of "exit media program and turn off device." By outputting the capable devices action, the media guidance application is able to identify the correct devices to perform the action.

In some embodiments, the media guidance application may input each of the plurality of network-connected devices into a database listing device identifiers corresponding to network-connected devices. Continuing from the previous example, upon determining that the television and two tablets are capable devices, the database lists the device identifiers for specific network-connected devices (e.g., by network device identification). By having a device identification, the media guidance application can accurately determine the correct network-operating device to perform the action.

In some embodiments, the media guidance application may filter the database listing device identifiers corresponding to network-connected devices based on each of the plurality of network-connected devices to identify the plurality of device identifiers for each of the plurality of network-connected devices. Continuing from the previous example, the database results will filter all the device identifiers to only those devices which are connected to the network. Here, both the tablets and the television are connected to the home network and thus will be listed as "filtered" results. By filtering the device identifiers, the media guidance application can more accurately determine the target devices to perform the action.

In some embodiments, the media guidance application may output the plurality of device identifiers for each of the plurality of network-connected devices. Continuing from the previous example, the media guidance application may output the device identifiers for each network-connected device. Here, the media guidance application will output device identifiers for the television and two tablets. By outputting the device identifiers for the network-connected devices, the media guidance application is able to identify the correct devices to perform the action.

In some embodiments, the media guidance application may input the device identifier that corresponds to the second keyword to the database listing device identifiers corresponding to network-connected devices. Continuing from the previous example, upon determining that the television and two tablets are capable devices, the device identifiers for the two tablets and the television (which correspond to the second keyword "everyone"), is input into the database. By having a device identification, the media guidance application can accurately determine the correct network-operating device to perform the action.

In some embodiments, the media guidance application may filter the database listing device identifiers corresponding to network-connected devices based on the device identifier that corresponds to the second keyword to identify the target device. Continuing from the previous example, the database results will filter all the device identifiers to only the two tablets and the television. By filtering the device identifiers, the media guidance application can more accurately determine the target devices to perform the action.

In some embodiments, the media guidance application may output the target device. Continuing from the previous example, the media guidance application may output both the tablets and the television as the target devices. By outputting the determined target devices, the media guidance application can identify the correct devices to perform the action.

In some embodiments, the media guidance application may input the action and the target device into a database listing criteria identifiers corresponding to specific actions on specific network-connected devices. Continuing from the previous example, upon determining that the television and two tablets are the target devices and the action (e.g., "exit media program and turn off device") are input into the database.

In some embodiments, the media guidance application may filter the database listing criteria identifiers corresponding to specific actions on specific network-connected devices based on the action and the target device to identify the plurality of criteria identifiers for performing the action on the target device. Continuing from the previous example, the database results will filter all the device specific criteria identifiers specific to the target devices such as "device shut-off", "pause", and "blank screen". By filtering the criteria identifiers, the media guidance application can more accurately determine the target devices to perform the action.

In some embodiments, the media guidance application may output the plurality of criteria identifiers for performing the action on the target device. Continuing from the previous example, the media guidance application may output all criteria identifiers (e.g., as mentioned above). By outputting the criteria identifiers for the target devices, the media guidance application can identify the correct set of potential action criterion to be performed by the target devices.

In some embodiments, the media guidance application may input the action and the target device into a database listing command codes corresponding to specific actions on specific network-connected devices. Continuing from the previous example, upon determining that the television and two tablets are the target devices and the action (e.g., "exit media program and turn off device") are input into the database, the database lists specific command codes for specific actions. For example, the database may list a hash function corresponding to "shut out device" for the television. In some embodiments, the command code may be any variant of digital information, cryptography, blockchain, hash function, mathematical function, or similar code. By having corresponding command codes, the media guidance application can accurately determine the target devices to perform the action.

In some embodiments, the media guidance application may filter the database listing command codes corresponding to specific actions on specific network-connected devices based on the action and the target device to identify the command code. Continuing from the previous example, the database results will filter all the actions for the target device based on the action and corresponding command codes.

In some embodiments, the media guidance application may output the command code. Continuing from the previous example, the media guidance application may output the specific hash code. By outputting the command code, the media guidance application has specific data corresponding to a specific action for the target device which enables the action to be performed with accuracy.

In some embodiments, the media guidance application may input the action criterion into a database listing command settings corresponding to performing specific actions according to specific criteria on specific network-connected devices. In some embodiments, the command setting may be any variant of digital information, cryptography, blockchain, hash function, mathematical function, or similar code. Continuing from the previous example, upon determining that the television and two tablets must be turned off in "25 minutes" (e.g., action criterion), this is input into the database.

In some embodiments, the media guidance application may filter the database listing command settings corresponding to performing specific actions according to specific criteria on specific network-connected devices based on the action criterion to identify the command setting for executing the action on the target device according to the action criterion. Continuing from the previous example, the database results will filter all the actions for the target device based on the action criterion and identify a command setting for execution specific to the two tablets and the television. The command setting may be a device related information.

In some embodiments, the media guidance application may output the command setting. Continuing from the previous example, the media guidance application may output the specific device related information. By outputting the command setting, the media guidance application has specific data corresponding to a specific action for the target device which enables the action to be performed with accuracy.

In some embodiments, the media guidance application may generate the command based on the command code and the command setting. Continuing from the previous example, the command for the television and two tablets may be generated by the hash code (e.g., command code) and the command setting (e.g., device related information). By generating the command based on both the command code and the command setting, the media guidance application has specific data corresponding to a specific action for the target device which enables the action to be performed with accuracy.

In some embodiments, the media guidance application may retrieve the plurality of criteria identifiers from the first user device. Continuing from the previous example, the media guidance application may retrieve the criteria identifiers from the father's mobile phone from which the input was given. For example, the mobile phone may have information about the television and two tablets (e.g., target devices) which may be useful to determining the criteria identifiers of the target devices. In some embodiments, the user device may prepopulate its memory with information of all network-connected devices on the network. By retrieving the criteria identifiers from the first user device, the media guidance application may expediently configure the target devices to perform the action.

In some embodiments, the media guidance application may retrieve custom criteria identifiers to be used as the plurality of criteria identifiers, wherein the custom criteria identifiers are retrieved from an external source. Continuing from the previous example, the media guidance application may retrieve the criteria identifiers from the television manufacturer's website which has full information and support for the television device. In some embodiments, an external source may be a remote server, a manufacturer's website, a device repository, a preprogrammed destination by the network-connected object. By retrieving the criteria identifiers from an external source, the media guidance application may expediently configure the target devices to perform the action.

In some embodiments, the media guidance application may detect connectivity of the target device to the first user device. Continuing from the previous example, the father's mobile phone may detect the television on the same network.

In some embodiments, the media guidance application may retrieve action data from the target device, wherein the action data comprises one or more actions associated with the target device. Continuing from the previous example, the father's mobile phone may retrieve information in relation to the TV's functionality from his mobile phone.

In some embodiments, the media guidance application may generate the plurality of criteria identifiers, wherein each of the plurality of criteria identifiers is associated with the action data. Continuing from the previous example, the father's mobile phone may create a number of actions, specific to the television, from the retrieved information. By retrieving the information from the target device upon connectivity to the network, the media guidance application efficiently gathers the information needed to determine whether the target device can accomplish the action.

In some embodiments, the media guidance application may transmit a request to a remote server for action data in association with the target device, wherein action data comprises one or more actions associated with the target device. Continuing from the previous example, the media guidance application may send a request to the television (e.g., target device) manufacturer's website for action data (e.g., types of features/actions associated with the television). By retrieving the information from a remote server, the media guidance application receives information required to determine whether the target device is capable to perform the action.

In some embodiments, the media guidance application may receive the action data from the remote server in association with the target device. Continuing from the previous example, the media guidance application may receive, from the manufacturer's website, action data associated with the television.

In some embodiments, the media guidance application may generate the plurality of criteria identifiers, wherein each of the plurality of criteria identifiers is associated with the action data. Continuing from the previous example, the media guidance application may generate, based on the action data, a number of criteria identifiers which are used to determine whether the target device can perform the action criterion (e.g., "leave . . . in 25 minutes"). By generating criteria identifiers from action data from a remote server, the media guidance application receives information required to determine whether the target device is capable to perform the action.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
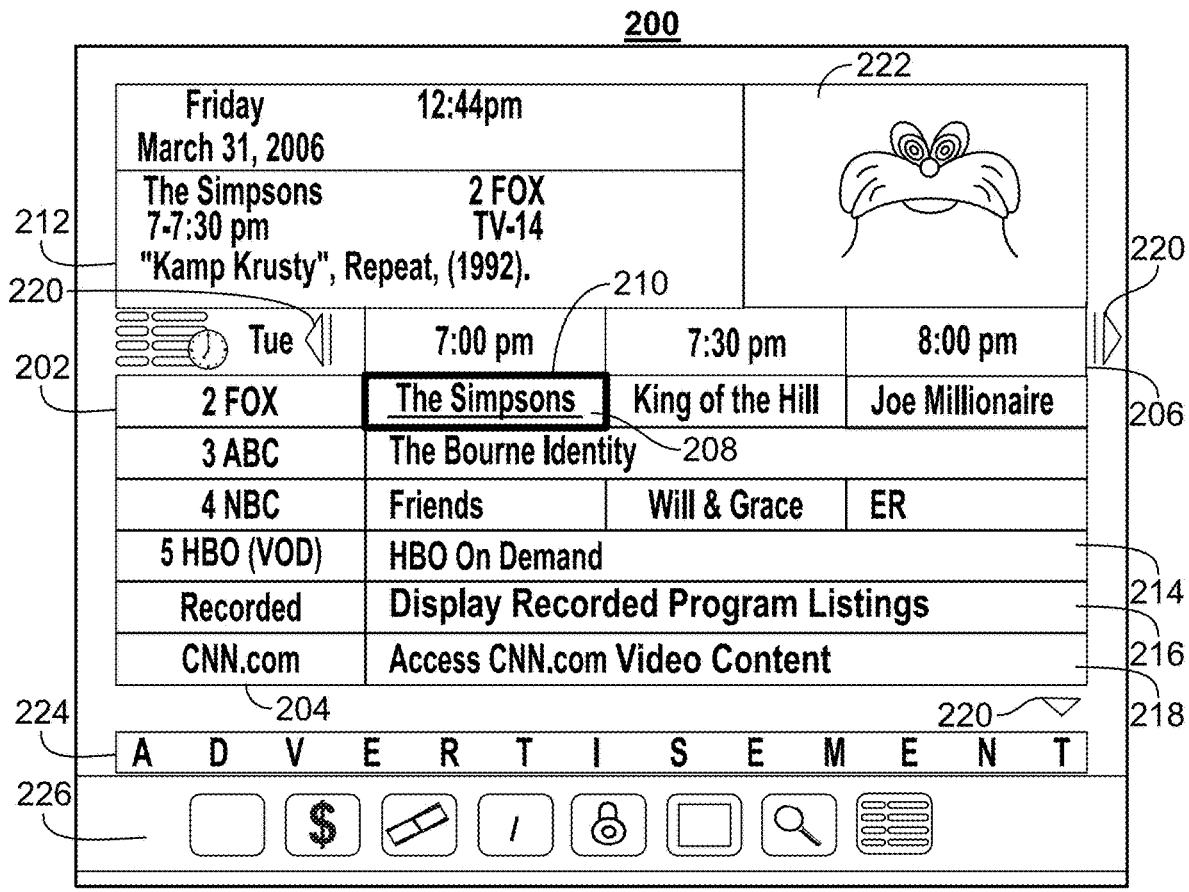
FIG. 2 shows an illustrative embodiment of a display screen that may be used to provide media guidance application listings and other media guidance information, in accordance with some embodiments of the disclosure.
Figure 3:
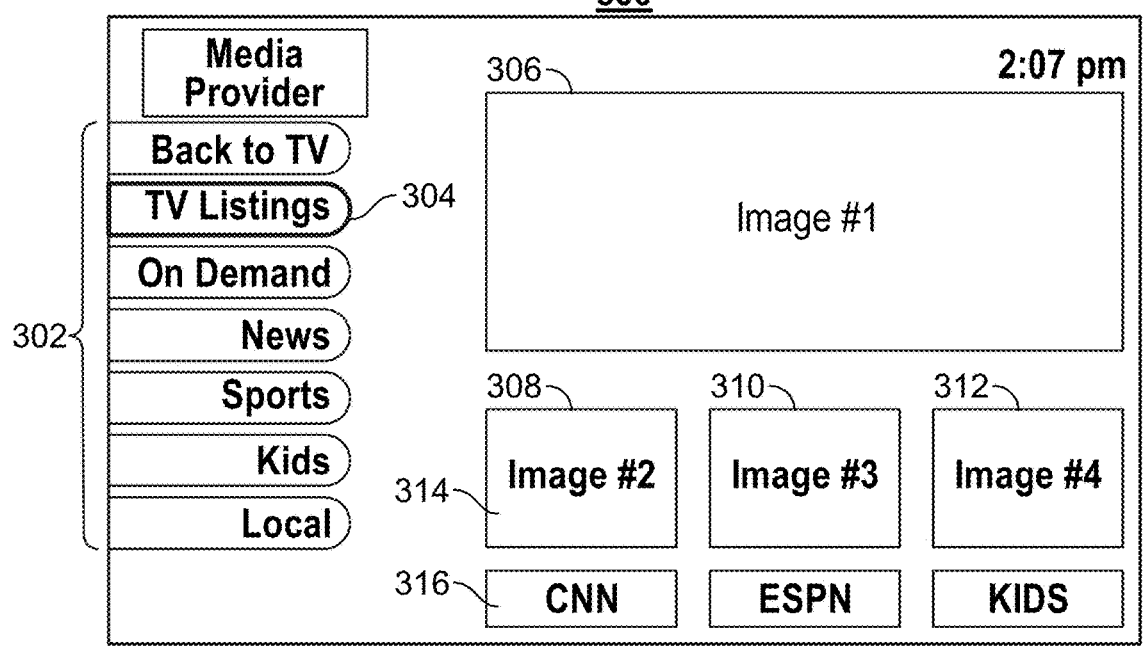
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
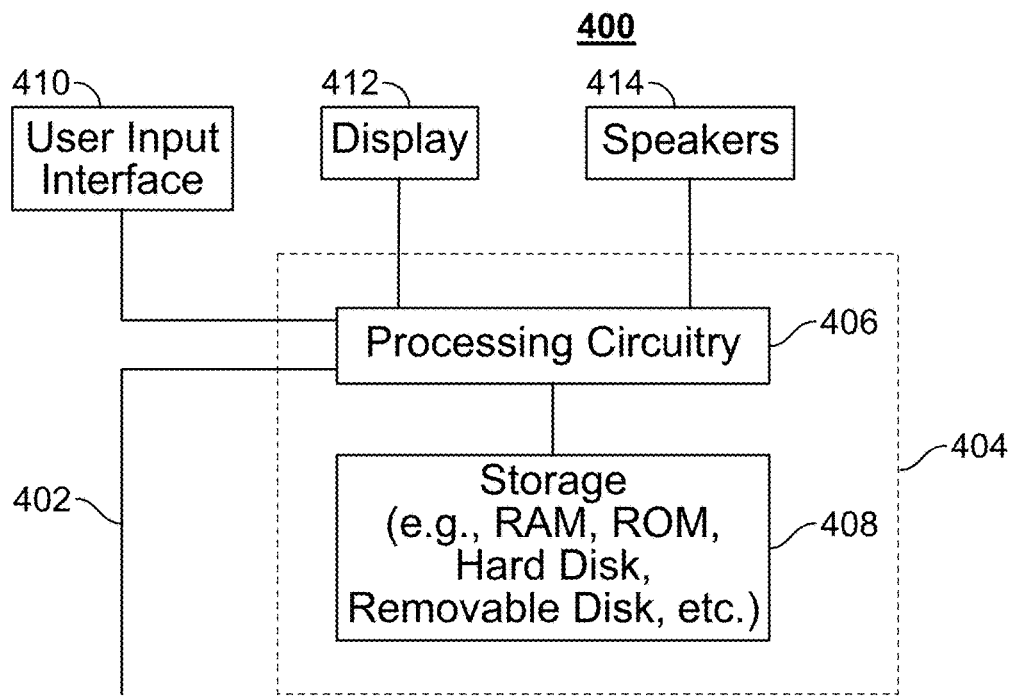
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may generate for display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
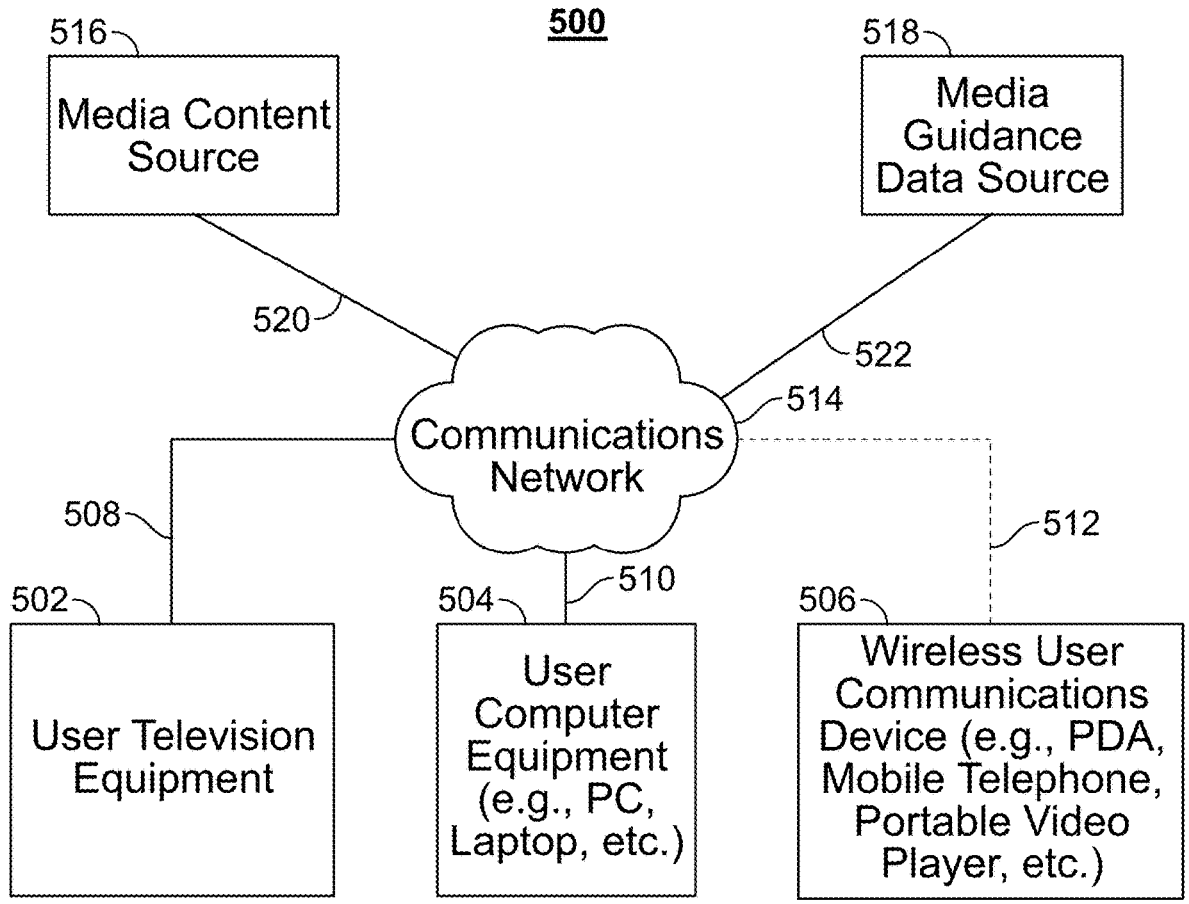
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition, or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
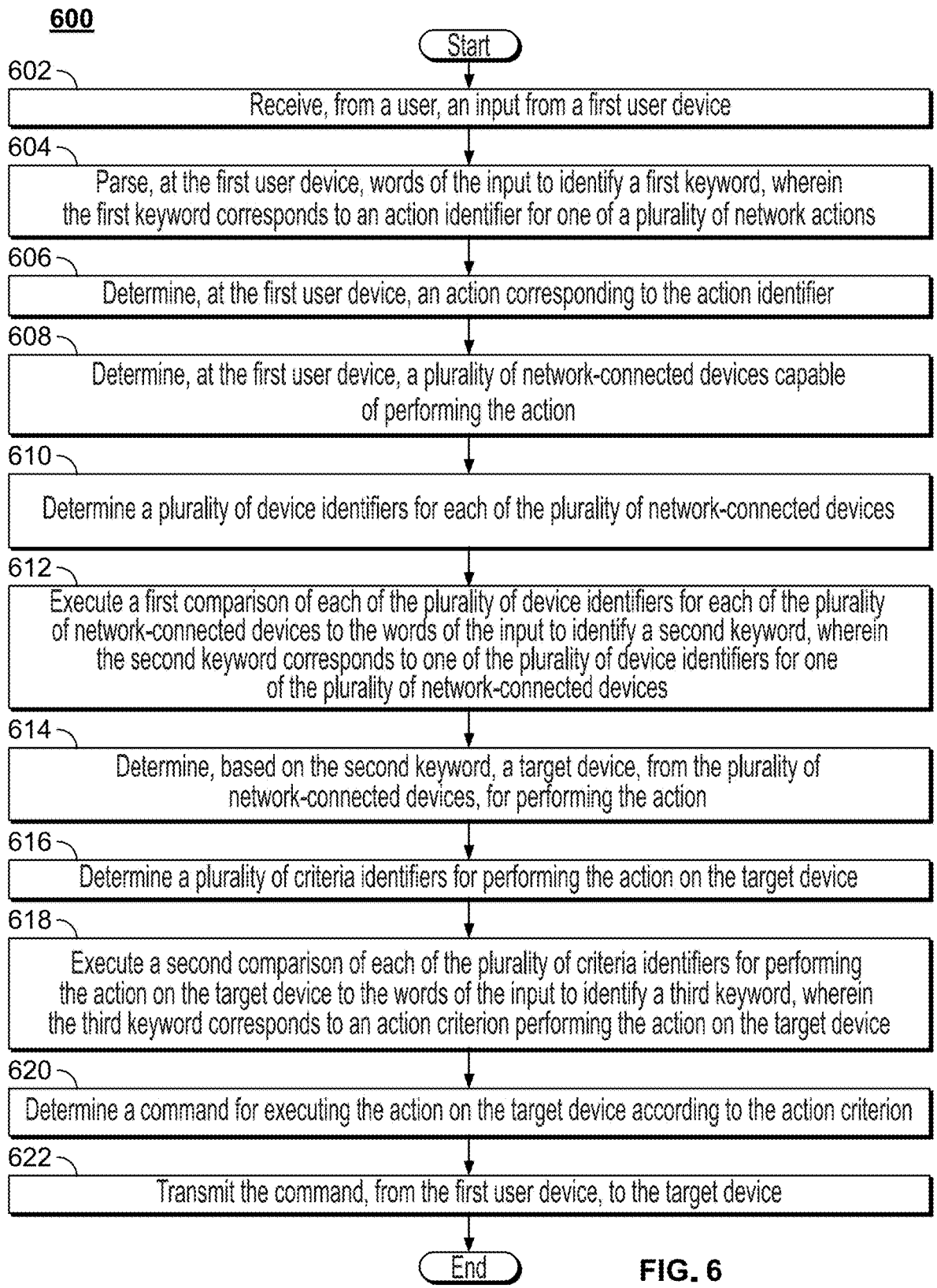
FIG. 6 is a flowchart of a process for performing actions on network-connected objects in response to reminders on devices, in accordance with some embodiments of the disclosure.

FIG. 6 depicts an illustrative flowchart of a process 600 for performing actions on network-connected objects in response to reminders on devices, in accordance with some embodiments of the disclosure. Process 600, and any of the following processes, may be executed by control circuitry 404 (e.g., in a manner instructed to control circuitry 404 by the media guidance application). Control circuitry 404 may be part of user equipment (e.g., user equipment 108, which may have any or all of the functionality of user television equipment 502, user computer equipment 504, and/or wireless communications device 506), or of a remote server separated from the user equipment by way of communication network 514, or distributed over a combination of both.

At 602, control circuitry 404 receives, from a user, an input (e.g., from user input interface 410) from a first user device (e.g., one of user television equipment 502, user computer equipment 504, or wireless user communication device 506). For example, the media guidance application receives voice input from the user interface 410 which is sent through network communication means from a user device 504.

At 604, control circuitry 404 parses, at the first user device (e.g., one of user television equipment 502, user computer equipment 504, or wireless user communication device 506), words of the input to identify a first keyword. The media guidance application, corresponds, by control circuitry 404, the first keyword, to an action identifier for one of a plurality of network actions. For example, the media guidance application uses control circuitry 404 to convert the received voice input and converts it into textual information. The media guidance application then parses the textual information by control circuitry 404 and identifies a keyword/words/phrase.

At 606, control circuitry 404 determines, at the first user device (e.g., one of user television equipment 502, user computer equipment 504, or wireless user communication device 506), an action corresponding to the action identifier. For example, the control circuitry 404 takes the identified keyword and determines an action using a similarity comparison analysis between the action identifier and the action. This may be accomplished by using a database.

At 608, control circuitry 404 determines, at the first user device (e.g., one of user television equipment 502, user computer equipment 504, or wireless user communication device 506), a plurality of network-connected devices capable of performing the action (e.g., one of user television equipment 502, user computer equipment 504, wireless user communication device 506, media content source 516, or media guidance data source 518). For example, the control circuitry 404, through the media guidance application, determines the network identifiers for all network-connected devices and receive operational information for each of the network-connected devices. The media guidance application uses the operational information to assess capability of each device to perform the action.

At 610, control circuitry 404 determines, a plurality of device identifiers for each of the plurality of network-connected devices. For example, control circuitry 404, through the media guidance application, receives the network identifiers for all the network-connected devices.

At 612, control circuitry 404 executes a first comparison of each of the plurality of device identifiers for each of the plurality of network-connected devices to the words of the input to identify a second keyword. The media guidance application, corresponds, by control circuitry 404, the second keyword to one of the plurality of device identifiers for one of the plurality of network-connected devices (e.g., one of user television equipment 502, user computer equipment 504, wireless user communication device 506, media content source 516, or media guidance data source 518).

At 614, control circuitry 404 determines, based on the second keyword, a target device, from the plurality of network-connected devices (e.g., one of user television equipment 502, user computer equipment 504, wireless user communication device 506, media content source 516, or media guidance data source 518), for performing the action. For example, control circuitry 404, through the media guidance application, determines the most capable device based on the number of similar types of actions available to be performed by the same device.

At 616, control circuitry 404 determines a plurality of criteria identifiers for performing the action on the target device (e.g., one of user television equipment 502, user computer equipment 504, wireless user communication device 506, media content source 516, or media guidance data source 518). For example, control circuitry 404, through the media guidance application, retrieves the criteria identifiers for performing the action on the target device from information stored within the target device.

At 618, control circuitry 404 executes a second comparison of each of the plurality of criteria identifiers for performing the action on the target device to the words of the input to identify a third keyword. The media guidance application, corresponds, by control circuitry 404, the third keyword to an action criterion performing the action on the target device (e.g., one of user television equipment 502, user computer equipment 504, wireless user communication device 506, media content source 516, or media guidance data source 518).

At 618, control circuitry 404 determines a command for executing the action on the target device according to the action criterion. For example, the control circuitry 404, through the media guidance application, determines a command by generating an instruction based on format retrieved from the criteria identifiers from the same target device.

At 620, control circuitry 404 transmits the command, from the first user device, to the target device (e.g., one of user television equipment 502, user computer equipment 504, wireless user communication device 506, media content source 516, or media guidance data source 518). For example, the transmission of the command by control circuitry 404 may be through communication means (e.g., wireless data packet communication) between control circuitry 404 and the target device.

Figure 7:
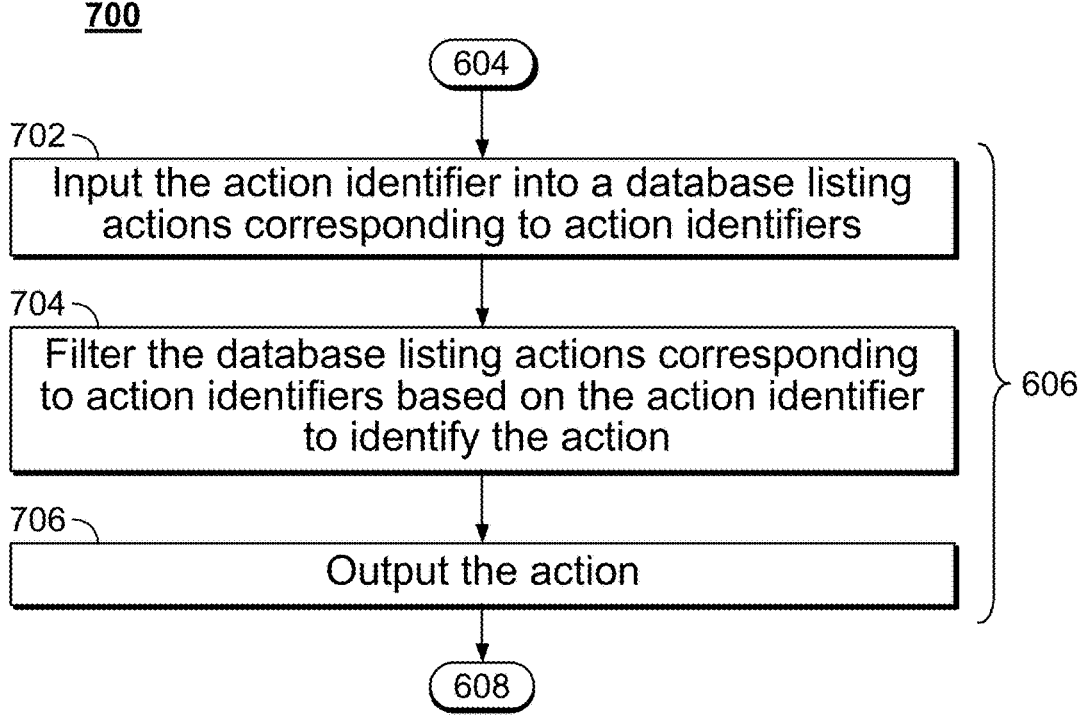
FIG. 7 is a flowchart of a process for determining the action corresponding to the action identifier, in accordance with some embodiments of the disclosure.

FIG. 7 depicts an illustrative flowchart of a process 700 for determining the action corresponding to the action identifier, in accordance with some embodiments of the disclosure. At 702, control circuitry 404 inputs the action identifier into a database listing actions corresponding to action identifiers.

At 704, control circuitry 404 filters the database listing actions corresponding to action identifiers based on the action identifier to identify the action. For example, control circuitry 404 filters the database based on a priority of devices. Control circuitry 404 creates a priority of devices and is based on a historical use of the devices by control circuitry.

At 706, control circuitry 404 determines whether the database listing actions correspond to action identifiers based on the action identifier identifying the action. If, at 708, control circuitry determines "No," the database listing actions does not correspond to action identifiers based on the action identifier identifying the action, the process advances to 602.

If, at 708, control circuitry 404 determines "Yes," the database listing actions corresponds to action identifiers based on the action identifier identifying the action, the process advances to 710. At 710, control circuitry 404 outputs the action. For example, the control circuitry 404 outputs the action through communication means (e.g., wireless data packet communication) between control circuitry 404 and the target device.

Figure 8:
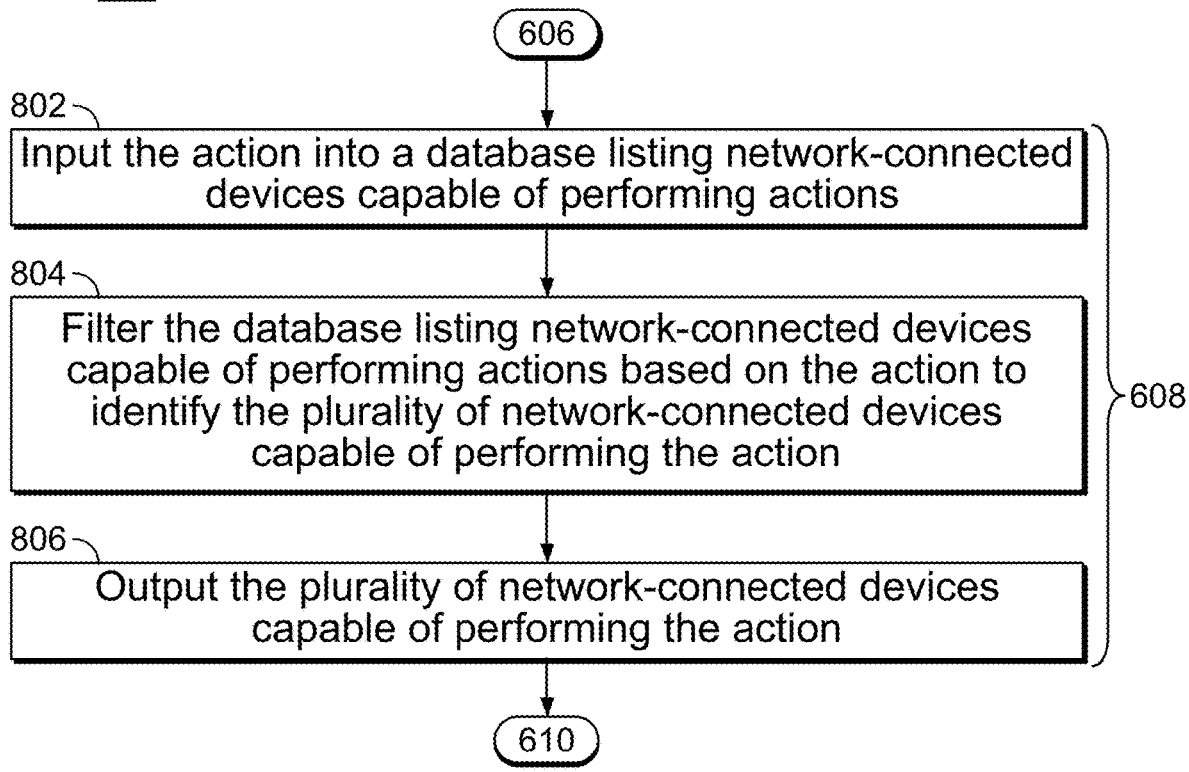
FIG. 8 is a flowchart of a process for determining the plurality of network-connected devices capable of performing the action, in accordance with some embodiments of the disclosure.

FIG. 8 depicts an illustrative flowchart of a process 800 for determining the plurality of network-connected devices capable of performing the action, in accordance with some embodiments of the disclosure. At 802, control circuitry 404 inputs the action into a database listing network-connected devices (e.g., one of user television equipment 502, user computer equipment 504, wireless user communication device 506, media content source 516, or media guidance data source 518) capable of performing actions.

At 804, control circuitry 404 filters the database listing network-connected devices capable of performing actions based on the action to identify the plurality of network-connected devices (e.g., one of user television equipment 502, user computer equipment 504, wireless user communication device 506, media content source 516, or media guidance data source 518) capable of performing the action. For example, control circuitry 404 filters the database based on a priority of devices. Control circuitry 404 creates a priority of devices and is based on a historical use of the devices by control circuitry.

At 806, control circuitry 404 outputs the plurality of network-connected devices capable of performing the action. For example, the control circuitry 404 outputs the plurality of network-connected devices capable of performing the action through communication means (e.g., wireless data packet communication) between control circuitry 404 and the respective devices (e.g., one of user television equipment 502, user computer equipment 504, wireless user communication device 506, media content source 516, or media guidance data source 518).

Figure 9:
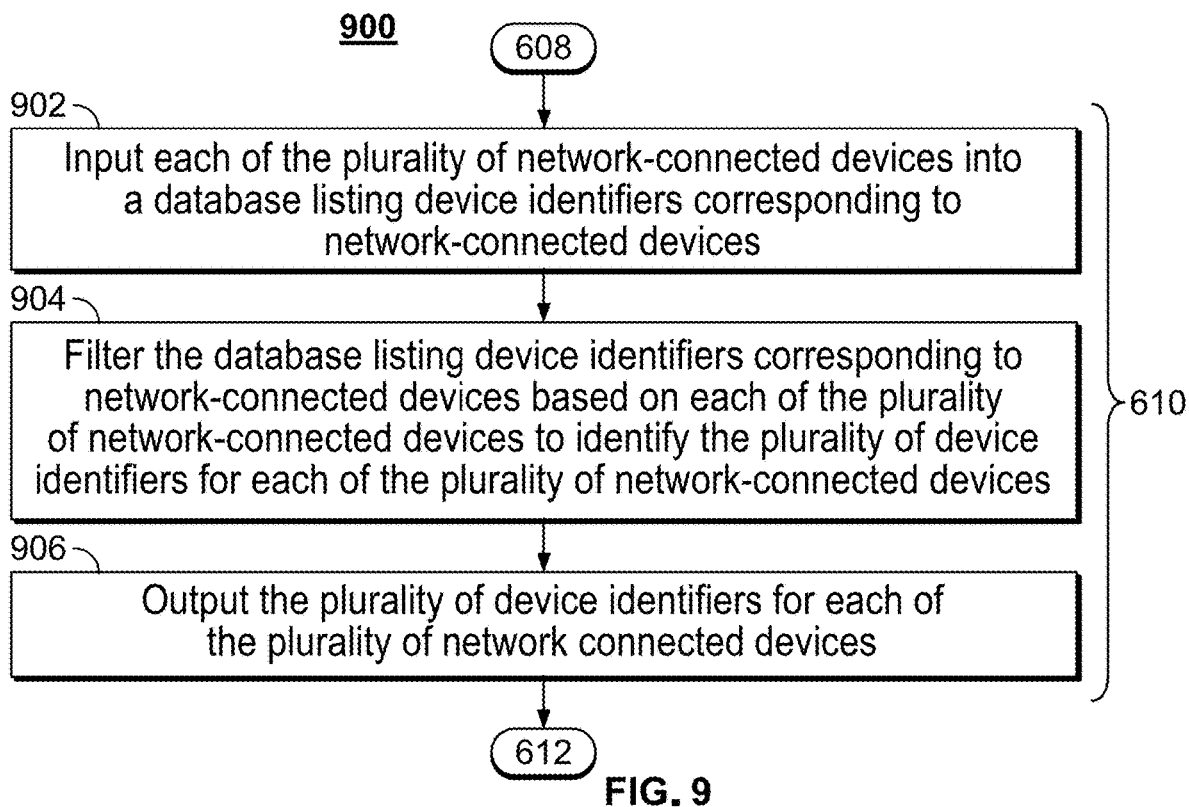
FIG. 9 is a determining a plurality of device identifiers for each of the plurality of network-connected devices, in accordance with some embodiments of the disclosure.

FIG. 9 depicts an illustrative flowchart of a process 900 for determining a plurality of device identifiers for each of the plurality of network-connected devices, in accordance with some embodiments of the disclosure. At 902, control circuitry 404 inputs each of the plurality of network-connected devices into a database listing device identifiers corresponding to network-connected devices.

At 904, control circuitry 404 filters the database listing device identifiers corresponding to network-connected devices based on each of the plurality of network-connected devices to identify the plurality of device identifiers for each of the plurality of network-connected devices (e.g., one of user television equipment 502, user computer equipment 504, wireless user communication device 506, media content source 516, or media guidance data source 518).

At 906, control circuitry 404 outputs the plurality of device identifiers for each of the plurality of network-connected devices (e.g., one of user television equipment 502, user computer equipment 504, wireless user communication device 506, media content source 516, or media guidance data source 518). For example, the control circuitry 404 outputs the plurality of device identifiers for each of the plurality of network-connected devices through communication means (e.g., wireless data packet communication) between control circuitry 404 and the respective devices (e.g., one of user television equipment 502, user computer equipment 504, wireless user communication device 506, media content source 516, or media guidance data source 518).

Figure 10:
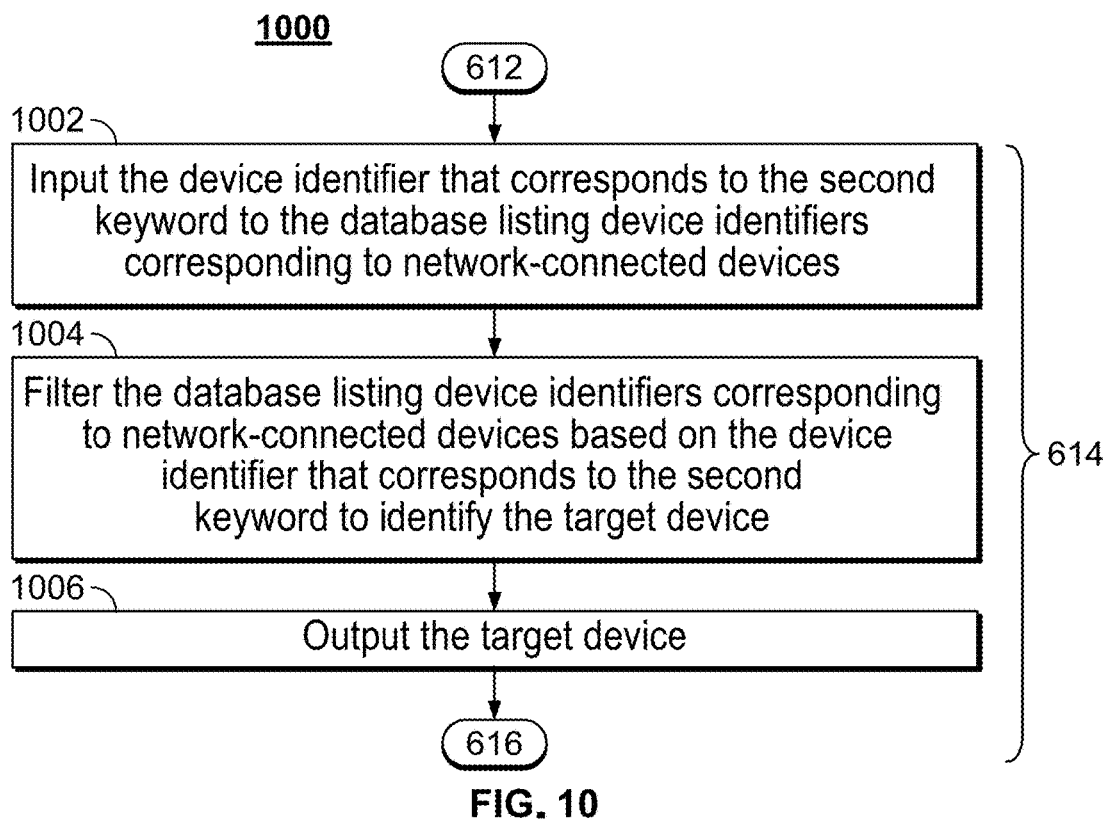
FIG. 10 is a flowchart of a process for determining, based on the second keyword, the target device, from the plurality of network-connected devices, for performing the action, in accordance with some embodiments of the disclosure.

FIG. 10 depicts an illustrative flowchart of a process 1000 for determining, based on the second keyword, the target device, from the plurality of network-connected devices, for performing the action, in accordance with some embodiments of the disclosure. At 1002, control circuitry 404 inputs the device identifier that corresponds to the second keyword to the database listing device identifiers corresponding to network-connected devices.

At 1004, control circuitry 404 filters the database listing device identifiers corresponding to network-connected devices based on the device identifier that corresponds to the second keyword to identify the target device (e.g., one of user television equipment 502, user computer equipment 504, wireless user communication device 506, media content source 516, or media guidance data source 518).

At 1006, control circuitry 404 determines whether the filtered device identifiers correspond to network-connected devices based on the device identifier that corresponds to the second keyword to identify the target device (e.g., one of user television equipment 502, user computer equipment 504, wireless user communication device 506, media content source 516, or media guidance data source 518). If, at 1008, control circuitry determines "No," the filtered device identifiers do not correspond to network-connected devices based on the device identifier that corresponds to the second keyword to identify the target device, the process advances to 602.

If, at 1008, control circuitry 404 determines "Yes," the filtered device identifiers correspond to network-connected devices based on device identifier that corresponds to the second keyword to identify the target device, the process advances to 1010. At 1010, control circuitry 404 outputs the target device (e.g., one of user television equipment 502, user computer equipment 504, wireless user communication device 506, media content source 516, or media guidance data source 518).

Figure 11:
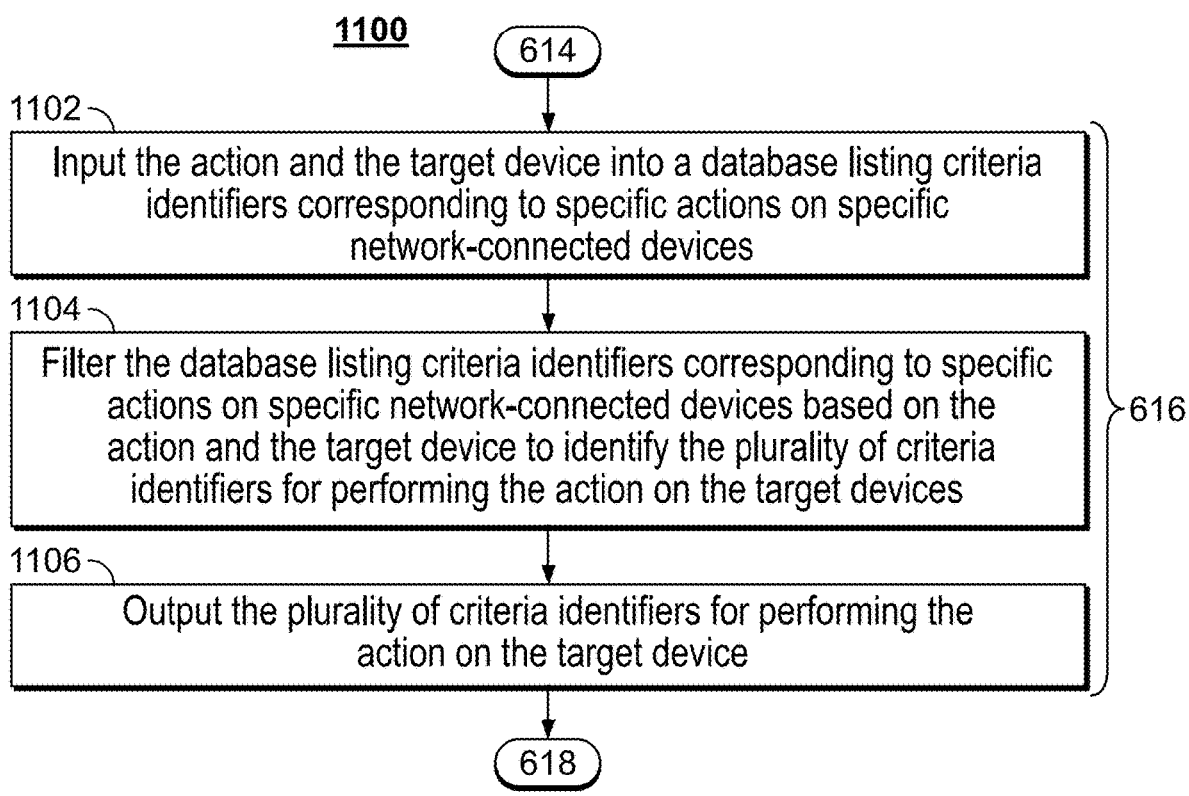
FIG. 11 is a flowchart of a process for determining the plurality of criteria identifiers for performing the action on the target device, in accordance with some embodiments of the disclosure.

FIG. 11 depicts an illustrative flowchart of a process 1100 for determining the plurality of criteria identifiers for performing the action on the target device, in accordance with some embodiments of the disclosure. At 1102, control circuitry 404 inputs the action and the target device into a database listing criteria identifiers corresponding to specific actions on specific network-connected devices (e.g., one of user television equipment 502, user computer equipment 504, wireless user communication device 506, media content source 516, or media guidance data source 518).

At 1104, control circuitry 404 filters the database listing criteria identifiers corresponding to specific actions on specific network-connected devices based on the action and the target device to identify the plurality of criteria identifiers for performing the action on the target device (e.g., one of user television equipment 502, user computer equipment 504, wireless user communication device 506, media content source 516, or media guidance data source 518).

At 1106, control circuitry 404 outputs the plurality of criteria identifiers for performing the action on the target device (e.g., one of user television equipment 502, user computer equipment 504, wireless user communication device 506, media content source 516, or media guidance data source 518). For example, the control circuitry 404 outputs the plurality of criteria identifiers for performing the action on the target device through communication means (e.g., wireless data packet communication) between control circuitry 404 and the target devices (e.g., one of user television equipment 502, user computer equipment 504, wireless user communication device 506).

Figure 12:
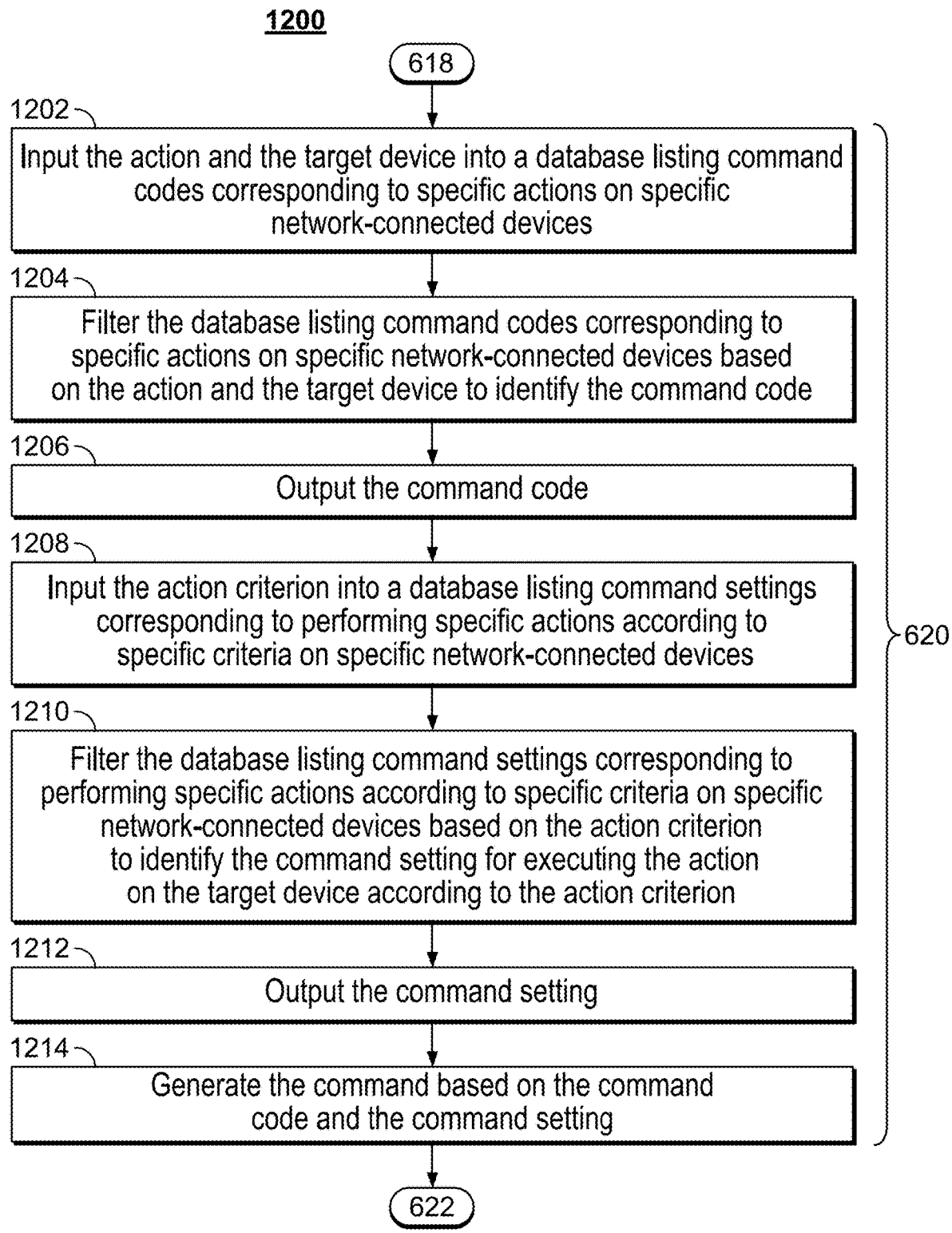
FIG. 12 is a flowchart of a process for determining the command for executing the action on the target device according to the action criterion, in accordance with some embodiments of the disclosure.

FIG. 12 depicts an illustrative flowchart of a process 1200 for determining the command for executing the action on the target device according to the action criterion, in accordance with some embodiments of the disclosure. At 1202, control circuitry 404 inputs the action and the target device into a database listing command codes corresponding to specific actions on specific network-connected devices (e.g., one of user television equipment 502, user computer equipment 504, wireless user communication device 506, media content source 516, or media guidance data source 518).

At 1204, control circuitry 404 filters the database listing command codes corresponding to specific actions on specific network-connected devices based on the action and the target device (e.g., one of user television equipment 502, user computer equipment 504, wireless user communication device 506, media content source 516, or media guidance data source 518) to identify the command code.

At 1206, control circuitry 404 outputs the command code. For example, the control circuitry 404 outputs the command code in a memory within the storage 608.

At 1208, control circuitry 404 inputs the action criterion into a database listing command settings corresponding to performing specific actions according to specific criteria on specific network-connected devices (e.g., one of user television equipment 502, user computer equipment 504, wireless user communication device 506, media content source 516, or media guidance data source 518).

At 1210, control circuitry 404 filters the database listing command settings corresponding to performing specific actions according to specific criteria on specific network-connected devices based on the action criterion to identify the command setting for executing the action on the target device according to the action criterion.

At 1212, control circuitry 404 outputs the command setting. For example, the control circuitry 404 outputs the command setting in a memory within the storage 608.

At 1214, control circuitry 404 generates the command based on the command code and the command setting. For example, control circuitry 404 retrieves the command code and command setting from storage 608, and generates a command for the target device.

Figure 13:
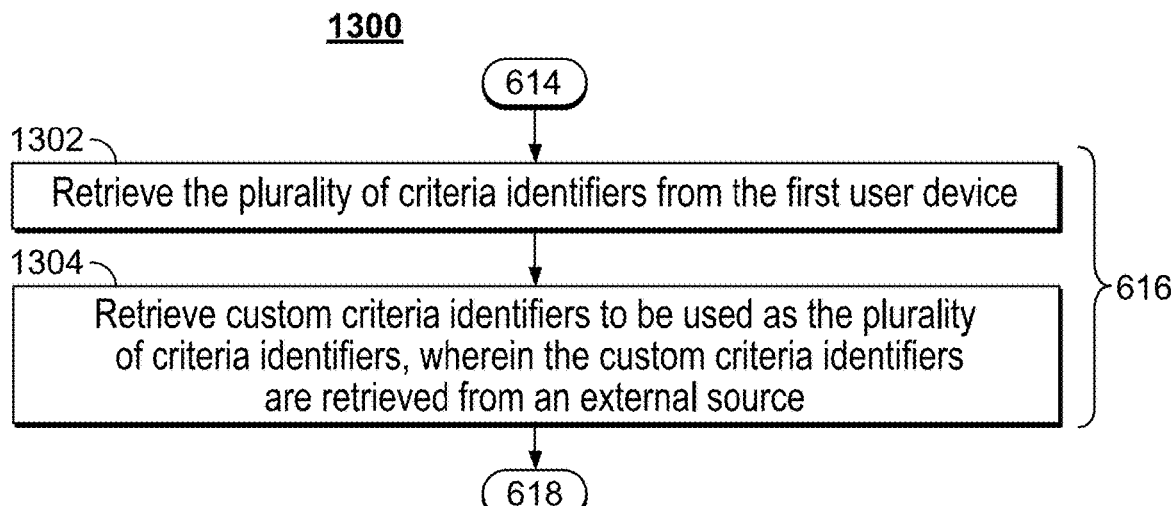
FIG. 13 is a flowchart of a process for determining the plurality of criteria identifiers for performing the action on the target device, in accordance with some embodiments of the disclosure.

FIG. 13 depicts an illustrative flowchart of a process 1300 for determining the plurality of criteria identifiers for performing the action on the target device, in accordance with some embodiments of the disclosure. At 1302, control circuitry 404 retrieves the plurality of criteria identifiers from the first user device (e.g., one of user television equipment 502, user computer equipment 504, or wireless user communication device 506).

At 1304, control circuitry 404 retrieves custom criteria identifiers to be used as the plurality of criteria identifiers. The media guidance application, retrieves, through control circuitry 404 the custom criteria identifiers from an external source.

Figure 14:
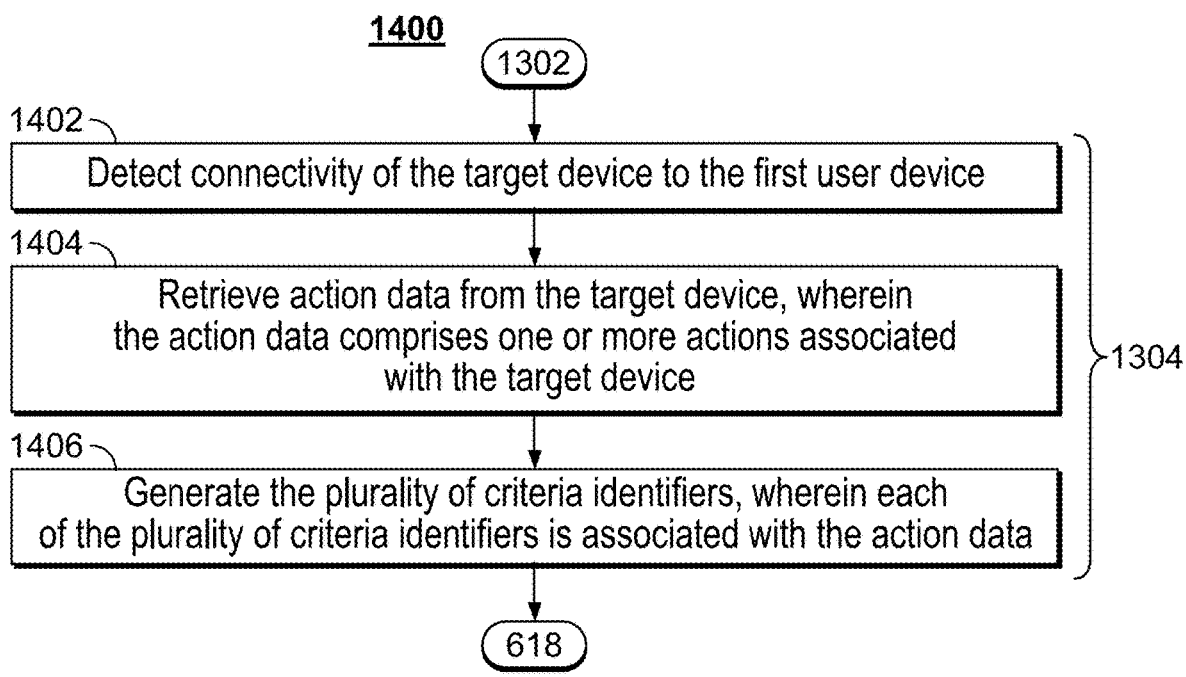
FIG. 14 is a flowchart of a process for retrieving custom criteria identifiers from an external source, in accordance with some embodiments of the disclosure.

FIG. 14 depicts an illustrative flowchart of a process 1400 for retrieving custom criteria identifiers from an external source, in accordance with some embodiments of the disclosure. At 1402, control circuitry 404 detects the connectivity of the target device to the first user device (e.g., one of user television equipment 502, user computer equipment 504, or wireless user communication device 506).

At 1402, control circuitry 404 retrieves action data from the target device, wherein the action data comprises one or more actions associated with the target device (e.g., one of user television equipment 502, user computer equipment 504, wireless user communication device 506, media content source 516, or media guidance data source 518). For example, the control circuitry 404 retrieves the action data from the target device by sending a retrieve command to the device identifier of the target device.

At 1404, control circuitry 404 generates the plurality of criteria identifiers, wherein each of the plurality of criteria identifiers is associated with the action data. For example, the control circuitry 404 creates a plurality of criteria identifiers from information contained within the action data specific to the target device.

Figure 15:
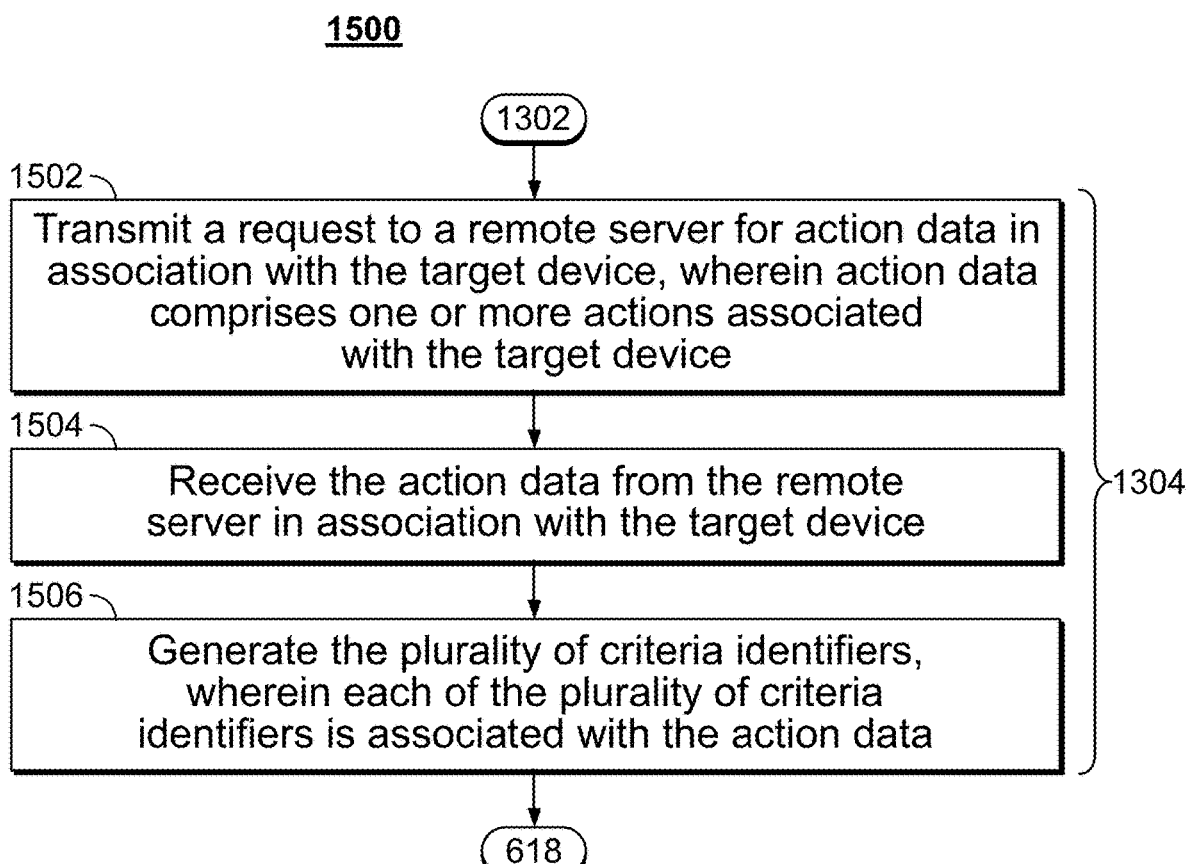
FIG. 15 is a flowchart of a process for retrieving custom criteria identifiers from an external source, in accordance with some embodiments of the disclosure.

FIG. 15 depicts an illustrative flowchart of a process 1500 for retrieving custom criteria identifiers from an external source, in accordance with some embodiments of the disclosure. At 1502, control circuitry 404 transmits a request to a remote server for action data in association with the target device, wherein action data comprises one or more actions associated with the target device (e.g., one of user television equipment 502, user computer equipment 504, wireless user communication device 506, media content source 516, or media guidance data source 518).

At 1502, control circuitry 404 retrieves the action data from the remote server in association with the target device (e.g., one of user television equipment 502, user computer equipment 504, wireless user communication device 506, media content source 516, or media guidance data source 518). For example, the control circuitry 404, through the media guidance application, may send a request to a remote server 715 to retrieve specific information in relation to the target device.

At 1504, control circuitry 404 generates the plurality of criteria identifiers, wherein each of the plurality of criteria identifiers is associated with the action data. For example, the control circuitry 404 creates a plurality of criteria identifiers from information received from the remote server 715.

It should be noted that processes 600-1500 or any step thereof could be performed on, or provided by, any of the devices shown in FIGS. 1 and 4-5. For example, any of processes 600-1500 may be executed by control circuitry 404 (FIG. 4) as instructed by control circuitry implemented on user equipment 502, 504, 506 (FIG. 5), and/or a user equipment device for selecting a recommendation. In addition, one or more steps of processes 600-1500 may be incorporated into or combined with one or more steps of any other process or embodiment.

It is contemplated that the steps or descriptions of each of FIGS. 6-15 may be used with any other embodiment of this disclosure. In addition, the steps and descriptions described in relation to FIGS. 6-15 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1A, 1B, 1C, and 4-5 could be used to perform one or more of the steps in FIGS. 6-15.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of user equipment 100 stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "related art" or "convention," any such reference is merely for the purpose of providing context to the invention(s) of the instant disclosure, and does not form any admission as to what constitutes the state of the art.

What is claimed is:

1. A method comprising:
receiving a single user command via a user input interface at an input device;
identifying, based on the single user command, a target device and an action;
determining, based on the single user command, that the action is to be initiated in response to one or more criteria;
determining, based on the single user command and the action, a sequence of device actions to be performed by the target device, the sequence of device actions comprising a first device action performed by the target device and a second device action performed by the target device after performing the first device action;
filtering a database listing command information corresponding to specific device actions at specific network-connected devices;
determining, from the filtered database, a command setting based on the one or more criteria;
generating, for the target device and based on the one or more criteria, a plurality of device commands corresponding to the sequence of device actions; and
causing the target device to execute the sequence of device actions by transmitting the plurality of device commands to the target device.

2. A method comprising:
receiving a single user command via a user input interface at an input device;
identifying, based on the single user command, a target device and an action;
determining, based on the single user command and the action, a sequence of device actions to be performed by the target device, the sequence of device actions comprising a first device action performed by the target device and a second device action performed by the target device after performing the first device action, wherein determining the sequence of device actions comprises:
identifying, from the single user command, an action keyword;
accessing a data structure comprising a mapping between the action keyword and the action indicative of the sequence of device actions;
determining, based on the data structure, the sequence of device actions corresponding to the action;
filtering a database listing command information corresponding to specific device actions at specific network-connected devices;
determining, from the filtered database, a command setting;
generating, for the target device, a plurality of device commands corresponding to the sequence of device actions; and
causing the target device to execute the sequence of device actions by transmitting the plurality of device commands to the target device.

3. A method comprising:
receiving a user command via a user input interface at an input device;
identifying, based on the user command, a target device and an action;
determining, based on the user command, that the action is to be initiated based at least in part on one or more criteria; and
determining, based on the user command and the action, a sequence of device actions to be performed by the target device;
generating, for the target device and based on the one or more criteria, a plurality of device commands corresponding to the sequence of device actions, wherein the one or more criteria comprise a timer criterion, and wherein the generating the plurality of device commands comprises setting a timer based on the timer criterion; and causing the target device to execute the sequence of device actions by:
transmitting the plurality of device commands to the target device; and
in response to the timer ending, causing the sequence of device actions to be initiated at the target device.

4. The method of claim 1, wherein the single user command indicates a plurality of target devices, the method further comprising:
for each target device of the plurality of target devices:
determining a respective sequence of device actions to be performed by the target device; and
generating, for the target device, a respective plurality of device commands corresponding to the sequence of device actions; and
wherein causing the target device to execute the sequence of device actions further comprises transmitting the respective plurality of device commands to each target device of the plurality of target devices.

5. The method of claim 1, further comprising:
filtering, based on the action and the target device, a database listing device action criteria of the target device for performing the sequence of device actions at the target device; and
determining, from the filtered database, a plurality of device action criteria corresponding to the sequence of device actions.

6. The method of claim 1, wherein identifying, based on the single user command, the target device and the action comprises filtering, based on device information for a plurality of network-connected devices, one or more network-connected devices that are capable of performing the action, wherein the one or more network-connected devices comprise the target device.

7. The method of claim 1, wherein generating the plurality of device commands corresponding to the sequence of device actions comprises:
inputting the action and the target device to a database listing command information corresponding to specific device actions at specific network-connected devices; and
filtering the database based on the action and the target device to identify the command information specific to the target device for performing the sequence of device actions, wherein the command information comprises a command code for the target device based on the sequence of device actions.

8. The method of claim 1, further comprising:
detecting connectivity between the target device and the input device;
retrieving, from the target device, action data associated with the sequence of device actions; and
wherein the plurality of device commands is generated based on the action data associated with the sequence of device actions.

9. A system comprising:
an input device comprising a user input interface; and
control circuitry configured to:
receive a single user command via the user input interface at the input device;
identify, based on the single user command, a target device and an action;
determine, based on the single user command, that the action is to be initiated in response to one or more criteria;
determine, based on the single user command and the action, a sequence of device actions to be performed by the target device, the sequence of device actions comprising a first device action performed by the target device and a second device action performed by the target device after performing the first device action;
filter a database listing command information corresponding to specific device actions at specific network-connected devices;
determine, from the filtered database, a command setting based on the one or more criteria
generate, for the target device and based on the one or more criteria, a plurality of device commands corresponding to the sequence of device actions; and
cause the target device to execute the sequence of device actions by transmitting the plurality of device commands to the target device.

10. The system of claim 9, wherein the control circuitry, when determining, based on the single user command and the action, the sequence of device actions, is configured to:
identify, from the single user command, an action keyword;
access a data structure comprising a mapping between the action keyword and the action indicative of the sequence of device actions; and
determine, based on the data structure, the sequence of device actions corresponding to the action.

11. The system of claim 9, wherein the one or more criteria comprise a timer criterion, and wherein the control circuitry, when generating the plurality of device commands based on the one or more criteria, is configured to:
set a timer based on the timer criterion; and
in response to the timer ending, cause the sequence of device actions to be initiated at the target device.

12. The system of claim 9, wherein the single user command indicates a plurality of target devices, and wherein the control circuitry is further configured to:
for each target device of the plurality of target devices:
determine a respective sequence of device actions to be performed by the target device; and
generate, for the target device, a respective plurality of device commands corresponding to the sequence of device actions; and
cause the target device to execute the sequence of device actions by transmitting the respective plurality of device commands to each target device of the plurality of target devices.

13. The system of claim 9, wherein the control circuitry is further configured to:
filter, based on the action and the target device, a database listing device action criteria of the target device for performing the sequence of device actions at the target device; and
determine, from the filtered database, a plurality of device action criteria corresponding to the sequence of device actions.

14. The system of claim 9, wherein the control circuitry, when identifying, based on the single user command, the target device and the action, is configured to filter, based on device information for a plurality of network-connected devices, one or more network-connected devices that are capable of performing the action, wherein the one or more network-connected devices comprise the target device.

15. The system of claim 9, wherein the control circuitry, when generating the plurality of device commands corresponding to the sequence of device actions, is configured to:
- input the action and the target device to a database listing command information corresponding to specific device actions at specific network-connected devices; and
- filter the database based on the action and the target device to identify the command information specific to the target device for performing the sequence of device actions, wherein the command information comprises a command code for the target device based on the sequence of device actions.

16. The system of claim 9, wherein the control circuitry is further configured to:
- detect connectivity between the target device and the input device;
- retrieve, from the target device, action data associated with the sequence of device actions; and
- wherein the control circuitry is configured to generate the plurality of device commands based on the action data associated with the sequence of device actions.

17. The method of claim 1, wherein:
- the first device action comprises at least one of exiting a media presentation, pausing the media presentation, changing the media presentation, transferring the media presentation, or displaying a notification; and
- the second device action comprises at least another one of turning off the target device, the exiting the media presentation, the pausing the media presentation, the changing the media presentation, the transferring the media presentation, or the displaying the notification.

18. The system of claim 9, wherein:
- the first device action comprises at least one of exiting a media presentation, pausing the media presentation, changing the media presentation, transferring the media presentation, or displaying a notification; and
- the second device action comprises at least another one of turning off the target device, the exiting the media presentation, the pausing the media presentation, the changing the media presentation, the transferring the media presentation, or the displaying the notification.

\* \* \* \* \*